United States Patent [19]

Hildebrand et al.

[11] Patent Number: 5,640,153

[45] Date of Patent: Jun. 17, 1997

[54] ENERGY UTILIZATION CONTROLLER AND CONTROL SYSTEM AND METHOD

[75] Inventors: Paul N. Hildebrand, Tulsa; T. Frank Knight, Owasso; Kelley A. Lawrence, Tulsa; Carlton R. Hildebrand, Oklahoma City, all of Okla.

[73] Assignee: Excel Energy Technologies, Ltd., Tulsa, Okla.

[21] Appl. No.: 679,157

[22] Filed: Jul. 12, 1996

Related U.S. Application Data

[63] Continuation of Ser. No. 349,180, Dec. 2, 1994, abandoned.

[51] Int. Cl.[6] ................................................. H04Q 7/14
[52] U.S. Cl. ........................... 340/825.06; 340/825.44; 340/825.47; 379/56; 379/102
[58] Field of Search ................. 340/825.06, 825.44, 340/825.07, 825.47, 825.69; 379/57, 102, 56

[56] References Cited

U.S. PATENT DOCUMENTS

| | | | |
|---|---|---|---|
| 4,208,630 | 6/1980 | Martinez | 340/825.44 |
| 4,360,881 | 11/1982 | Martinson | 340/825.69 |
| 4,454,509 | 6/1984 | Buennagel et al. | 340/825.69 |
| 4,589,075 | 5/1986 | Buennagel | 340/825.69 |
| 4,660,032 | 4/1987 | Tsunoda | 340/825.44 |
| 4,728,948 | 3/1988 | Fields | 340/825.06 |
| 4,856,047 | 8/1989 | Saunders | 379/57 |
| 4,860,005 | 8/1989 | DeLuca et al. | 340/825.44 |
| 5,043,721 | 8/1991 | May | 340/825.44 |
| 5,146,216 | 9/1992 | DeLuca et al. | 340/825.52 |
| 5,223,831 | 6/1993 | Kung et al. | 340/825.44 |
| 5,285,496 | 2/1994 | Frank et al. | 380/9 |
| 5,289,362 | 2/1994 | Liebl et al. | 364/140 |
| 5,302,947 | 4/1994 | Fuller et al. | 340/825.34 |
| 5,319,355 | 6/1994 | Russek | 340/573 |
| 5,337,044 | 8/1994 | Folger et al. | 340/825.44 |
| 5,347,268 | 9/1994 | Nelson et al. | 380/825.44 |
| 5,452,356 | 9/1995 | Albert | 380/9 |
| 5,481,255 | 1/1996 | Albert et al. | 340/825.55 |

OTHER PUBLICATIONS

Motorola Universal Programming System Pager Programming Interface Instruction Manual 68P81010B39-A (1990, 1992) no month available.

Motorola RNet™ Paging Data Receiver Programmer Quick Reference 6881018B75-A (date unknown).

Motorola RNet™ Paging Data Receiver Installation/Operation Manual 6881018B70-0 (1994) no month available.

*Primary Examiner*—Edwin C. Holloway, III
*Attorney, Agent, or Firm*—Dougherty, Hessin, Beavers & Gilbert

[57] ABSTRACT

Control data to change any of various parameters in energy management systems that control energy consumption devices, such as heating and air conditioning equipment, is transmitted from a remote location, through a paging network, to a plurality of paging data receivers connected to respective energy management systems. The paging data receivers respond to a common call and pass the accompanying control data to their respective energy management systems, which individually react depending on whether one or more predetermined addresses is/are within the control data. A response to the remote site can be provided by an energy management system through the commercial telephone network.

18 Claims, 10 Drawing Sheets

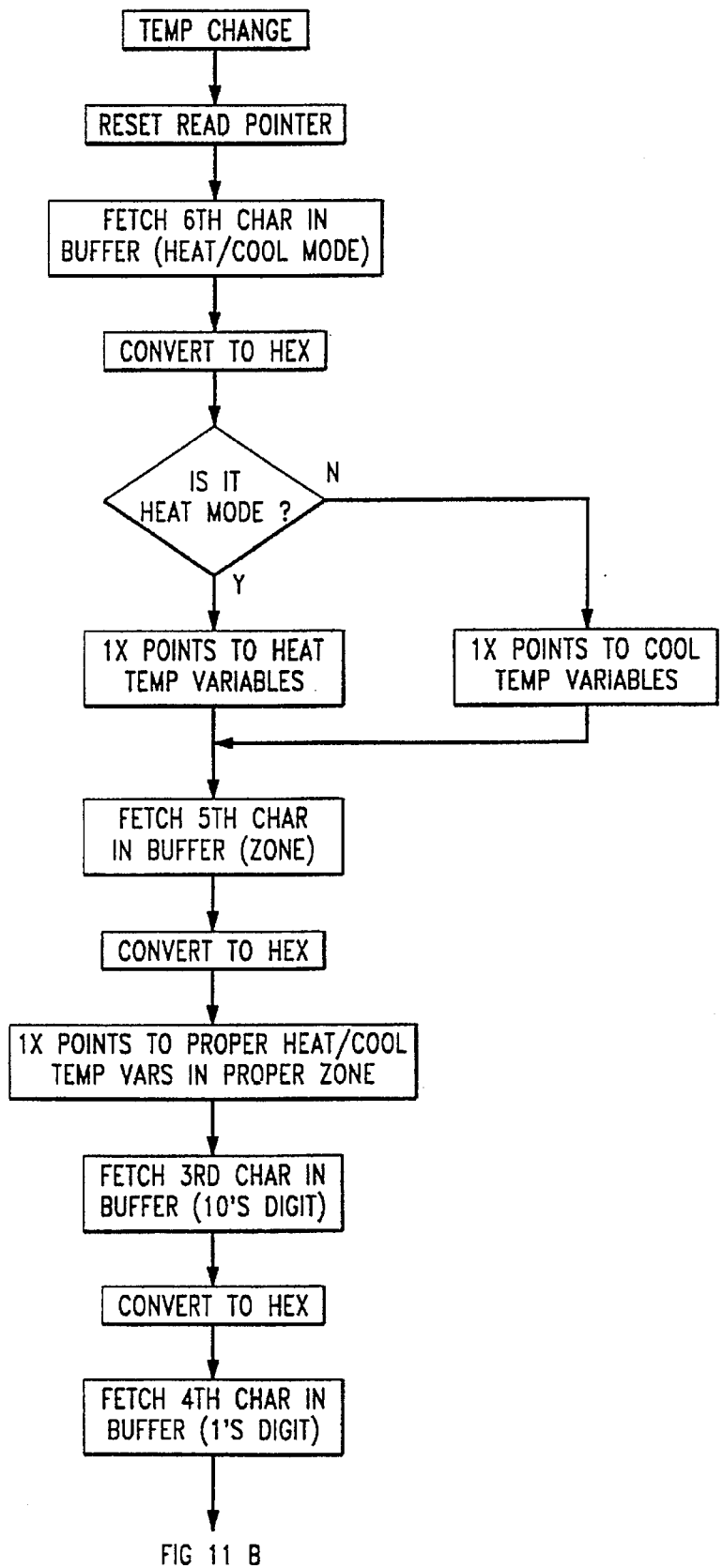
FIG 11 B
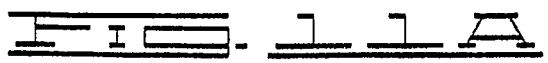

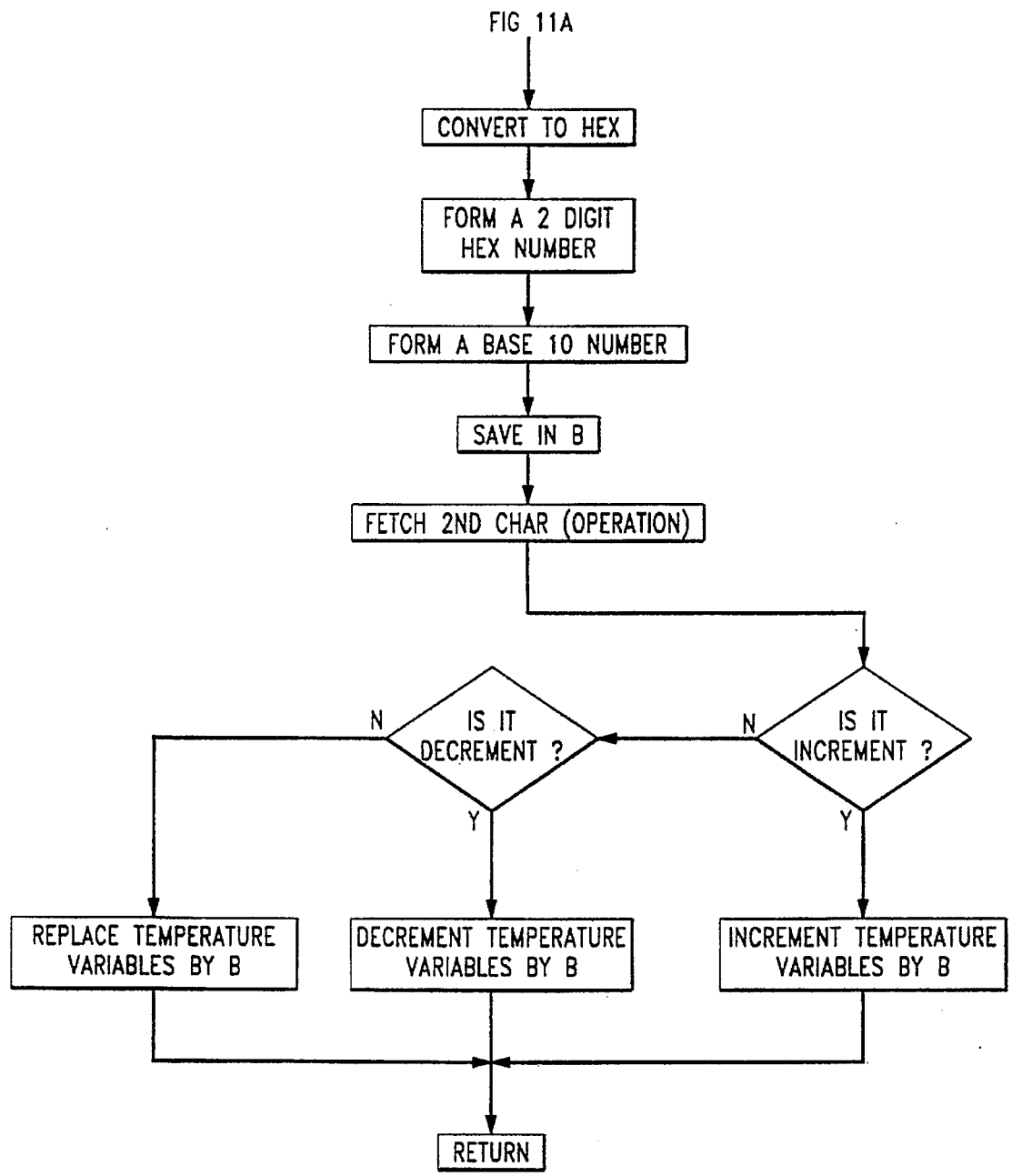

ENERGY UTILIZATION CONTROLLER AND CONTROL SYSTEM AND METHOD

This application is a continuation of application Ser. No. 08/349,180 filed on Dec. 2, 1994, now abandoned.

BACKGROUND OF THE INVENTION

This invention relates generally to a system and method for managing or controlling energy utilization at a plurality of spaced sites and it also relates generally to an energy utilization controller. More specifically, the present invention relates to providing for the remote control of one or more energy management systems which operate heating, ventilating and air conditioning equipment at commercial or residential buildings.

Energy management is critical for environmentally conscious, cost-effective operation of buildings where heating, ventilating and air conditioning (HVAC) are used. Whereas in the past some types of energy management controls have been relatively static (e.g., a residential thermostat set at one desired temperature to be maintained throughout the day in a home), now there are dynamic energy management systems that can control HVAC systems on a highly variable schedule. To enhance the operation of these dynamic systems, there is the need for a remote control capability.

By way of an example, an electric utility company that serves thousands of customers may want to communicate a control signal to a large group of its customers to change their respective energy management systems when the electric utility experiences a peak load condition. The utility could have individual dedicated control circuits connected with each of its customers' energy management systems, but this would be expensive and inflexible. The electric utility could also automatically telephone each energy management system if each system is connected to a respective telephone circuit. This would be time consuming to dial each number and retransmit the same control data for each number if a large number of customers had to be contacted.

Other ways of providing remote communications to energy management systems being proposed and used today are fiber optic and hardwired cable systems. An advantage of these systems is that not only can remote signals from the utility control centers be supplied to a commercial or residential user but also additional information can be supplied such as telephone communications, cable TV, data communications through the information highway, etc. Disadvantages of these methods include: 1) large capital costs for material and labor to install fiber optic and cable systems, communication/signal transmission equipment required and right of way acquisition, and 2) difficulties in the installation process (e.g., tunneling under roadways, conflicts with existing buried utility cable and pipes).

Still further, a radio signal can be transmitted to receivers as is done in the following manner where air conditioning compressors can be turned on or off. As done in the past, electric utilities have provided residential customers with a local radio frequency receiver and a drum type ratchet timer for duty cycling the customer's air conditioning compressor. When the timers that have been provided to customers are to be activated, the electric utility transmits the appropriate radio frequency. For example, such an activating signal may be sent at 2:00 pm and a deactivating signal may be sent at 8:00 pm. During such an activation period, compressors could cycle "on" for fifteen minutes (for example) if otherwise called for by their respective thermostats, then "off" for fifteen minutes (for example) regardless of what their local systems do. This is a simple means of limiting the utility's summer electrical demand. A disadvantage of this system is that it simply provides an "on" or "off" signal; it does not communicate variable control data or instructions. Thus, the activated drum timer cycles on and off the same regardless of ambient conditions; therefore, during days of high outside temperatures, residential home temperatures could rise to uncomfortable levels. For example, during a one hour period while the drum timer is active, the air conditioning compressor runs for at most a cumulative time of 30 minutes and is off for at least a cumulative time of 30 minutes under the foregoing example of fifteen minute duty cycling. With hot outside temperatures and possibly low insulation values in a home, however, it may have been necessary to run the air conditioning compressor for forty-five minutes during the one hour to maintain a comfortable indoor temperature (i.e., if the compressor had not been disabled, the home thermostat would have called for the compressor to run forty-five minutes). If control signals for one or more variable parameters could be used, however, possibly more efficient control could be realized so that both reduced energy load and more reasonable comfort could be obtained.

Although remote control techniques can be implemented as suggested above, there is the need for an improved remote control technique whereby a number of energy management systems at different locations can be substantially simultaneously controlled with various control signals as selected by the sender. It would be desirable to implement such control relatively inexpensively. There is also the need for such a system to communicate a respective acknowledgement or other information back to the remote sender.

SUMMARY OF THE INVENTION

The present invention overcomes the above-noted and other shortcomings of the prior art by providing a novel and improved energy utilization controller and control system and method. The present invention enables energy consumption to be more efficiently controlled so that natural resources and money can be saved, and it accomplishes these advantages in a relatively low cost but effective manner. This does not mean, however, that total energy usage is necessarily decreased; but it does provide for its more efficient use.

With the present invention, one or more energy management systems can be substantially simultaneously provided with various control instructions. Then, at the time, each preferred energy management system can provide a response or other information to the sender. This is accomplished using existing infrastructures. For example, in a preferred embodiment, control signals are provided through an existing telephone network, but by dialing only a single telephone number in a given application. The control signals are communicated to all the energy management systems which respond to the common transmission via the single telephone number. The control signals are received through paging data receivers responding to a common capcode assigned to the telephone number. Each paging data receiver is connected to a respective energy management system, which reacts to the received control data when such data includes a further address recognized by the respective energy management system.

One of the aforementioned paging data receivers and its associated energy management system define an energy utilization controller of the present invention. The paging data receiver has a data output port. The energy management system is connected to the data output port, and the energy management system controls discrete energy consuming devices in response to data received from the data output port of the paging data receiver.

The present invention also provides a system for managing energy utilization at a plurality of spaced sites. This system comprises a plurality of the aforementioned energy utilization controllers wherein each of the energy utilization controllers is disposed at a respective one of a plurality of spaced sites. The paging data receivers of the energy utilization controllers respond to an identical addressing code so that the energy utilization controllers receive control data substantially simultaneously from a transmission of the control data occurring remotely from the energy utilization controllers.

The method of the present invention for controlling energy utilization comprises steps of: (a) transmitting an addressing code and data through a paging network; (b) receiving the transmitted addressing code and data; and (c) automatically changing the operation of an energy consuming device in response to the received data.

The method of controlling energy utilization can also be defined as comprising steps of: (a) providing control data to an energy management system from a site remote from the energy management system; (b) using the control data in the energy management system; (c) generating data in the energy management system in response to using the control data in the energy management system; and (d) transmitting the data of step (c) through a commercial telephone network from the energy management system to the site remote from the energy management system.

Therefore, from the foregoing, it is a general object of the present invention to provide a novel and improved energy utilization controller and control system and method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 2 is a block diagram in more detail of preferred embodiment implementations of the system shown in FIG. 1.

FIG. 6 illustrates the communications format used for communicating with the paging data receiver of the particular implementation shown in FIG. 5.

FIGS. 8A and 8B illustrate an application of the communications format of FIG. 6 and the hierarchy of FIG. 7.

FIGS. 11A and 11B are a flow chart of a program for controlling temperature in response to control data received in an energy management system of the present invention.

DETAILED DESCRIPTION OF PREFERRED EMBODIMENTS

Figure 1:
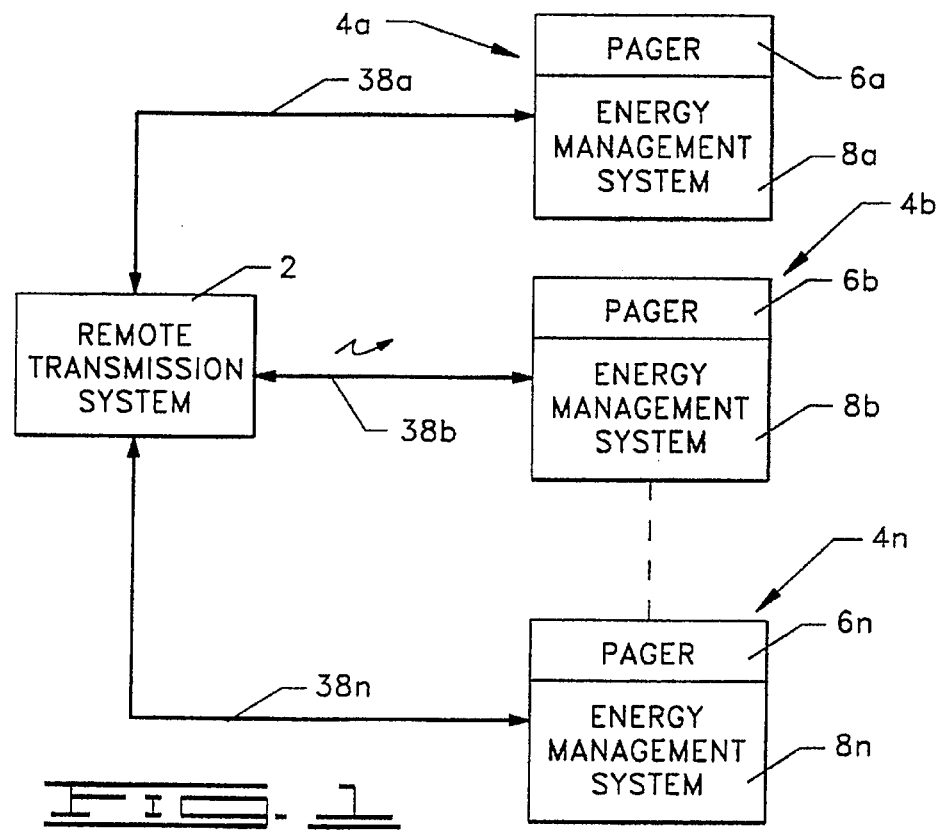
FIG. 1 is a block diagram of the preferred embodiment energy utilization control system.

FIG. 1 illustrates the energy utilization control system of the present invention. A remote transmission is sent through a remote transmission system 2 to a plurality of other spaced locations where energy utilization controllers 4 of the present invention are located. Each controller 4 includes a paging data receiver (pager) 6 and an energy management system 8.

By way of example, the sender at the remote site can be an electric utility or a management company which must oversee the operation of a number of commercial buildings. In the example of the utility, it may need to send control data to the energy utilization controllers 4 when one or more alarm parameters (e.g., excessive feeder phase currents, sagging phase voltages, etc.) are detected.

FIG. 2 represents the energy management system 8 controlling discrete energy consuming devices 9, such as air and/or water heating and/or cooling equipment located in a commercial or residential building, in response to data received through the respective pager 6. FIG. 2 also shows alternative preferred embodiments of the remote transmission system 2 represented in FIG. 1. This remote transmission system comprises a sending apparatus 10, a commercial telephone network 12 and a commercial paging network 14.

The sending apparatus 10 can be implemented in any suitable manner. For example, as shown in FIG. 2 it can include a computer 16 (e.g., personal computer, notebook computer, personal data assistant, etc.) communicating with the commercial telephone system 12 through a modem 18. As another example, the sending apparatus 10 can be implemented with a tone-generating telephone set 20. Still another example of the sending apparatus 10 includes a conventional cellular telephone 22 and a cellular network 24 with which the cellular telephone 22 communicates. In the telephone set and cellular phone embodiments, at least, it is preferred that the sender first enter a personal identification number before control communications proceed.

Whatever embodiment of the sending apparatus 10 is used, it initiates a communication with the commercial telephone network 12 by sending a single telephone number. This telephone number is used to access the commercial paging network 14. The paging network 14 converts, in known manner, the called telephone number to a corresponding "capcode" which the commercial paging network 14 then transmits with the accompanying control data on the assigned frequency (e.g., 931.6875 megahertz). If the "capcode" is the same as that for which the pagers 6 of the apparatus 4 are programmed, the pagers 6 respond by receiving and transferring the additional information included in the remote transmission.

Figure 3:
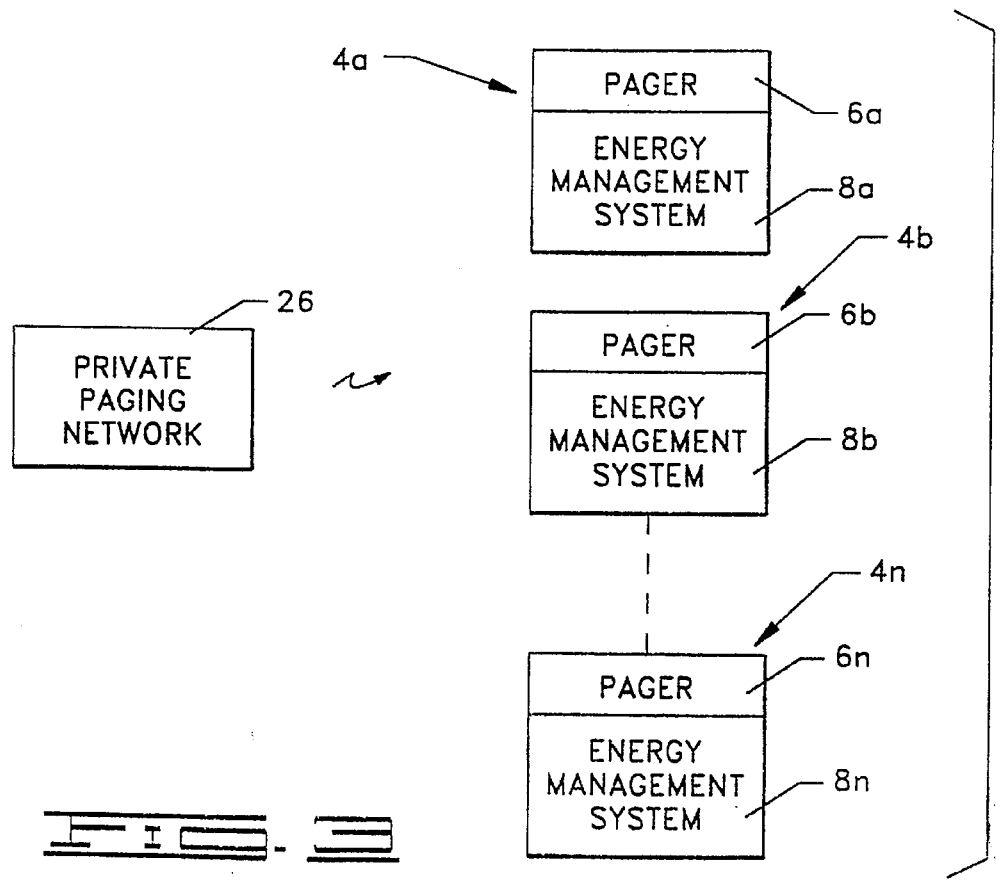
FIG. 3 is a block diagram of another implementation of the system shown in FIG. 1.

An alternative to the remote transmission embodiments of FIG. 2 is illustrated in FIG. 3. This shows the remote transmission occurring through a private paging network 26 such as may be maintained by an electric utility.

Figure 4:
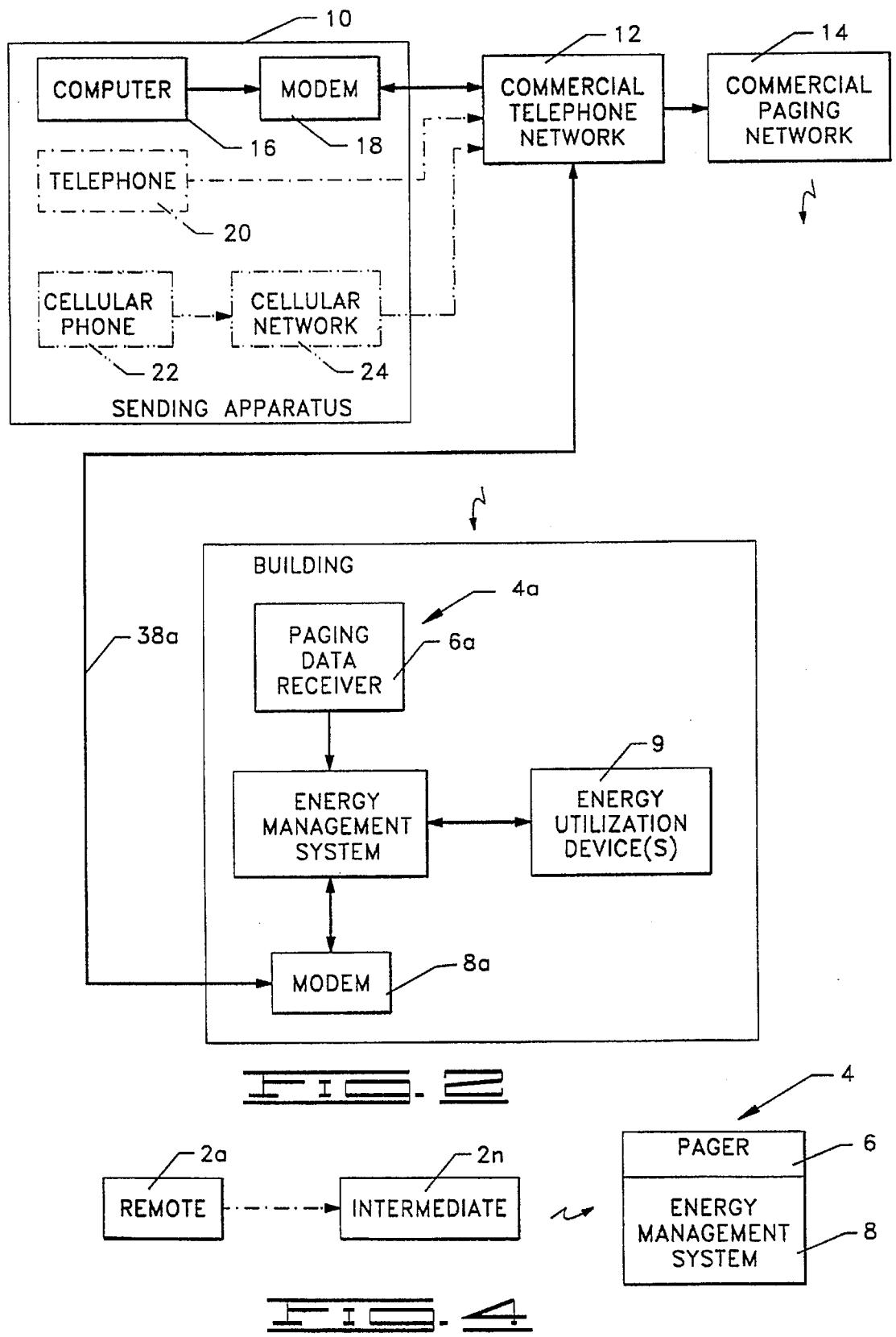
FIG. 4 is a block diagram showing that the remote transmission of FIG. 1 can occur through multiple communication links.

FIG. 4 shows that there can be one or more intermediate transmissions 2a . . . 2n used in transferring the control information from the remote site to the individual apparatus 4.

In the preferred embodiments communication occurs as described above (except that a telephone number need not be dialed if the capcode is directly generated such as may occur in a private paging network).

Figure 5:
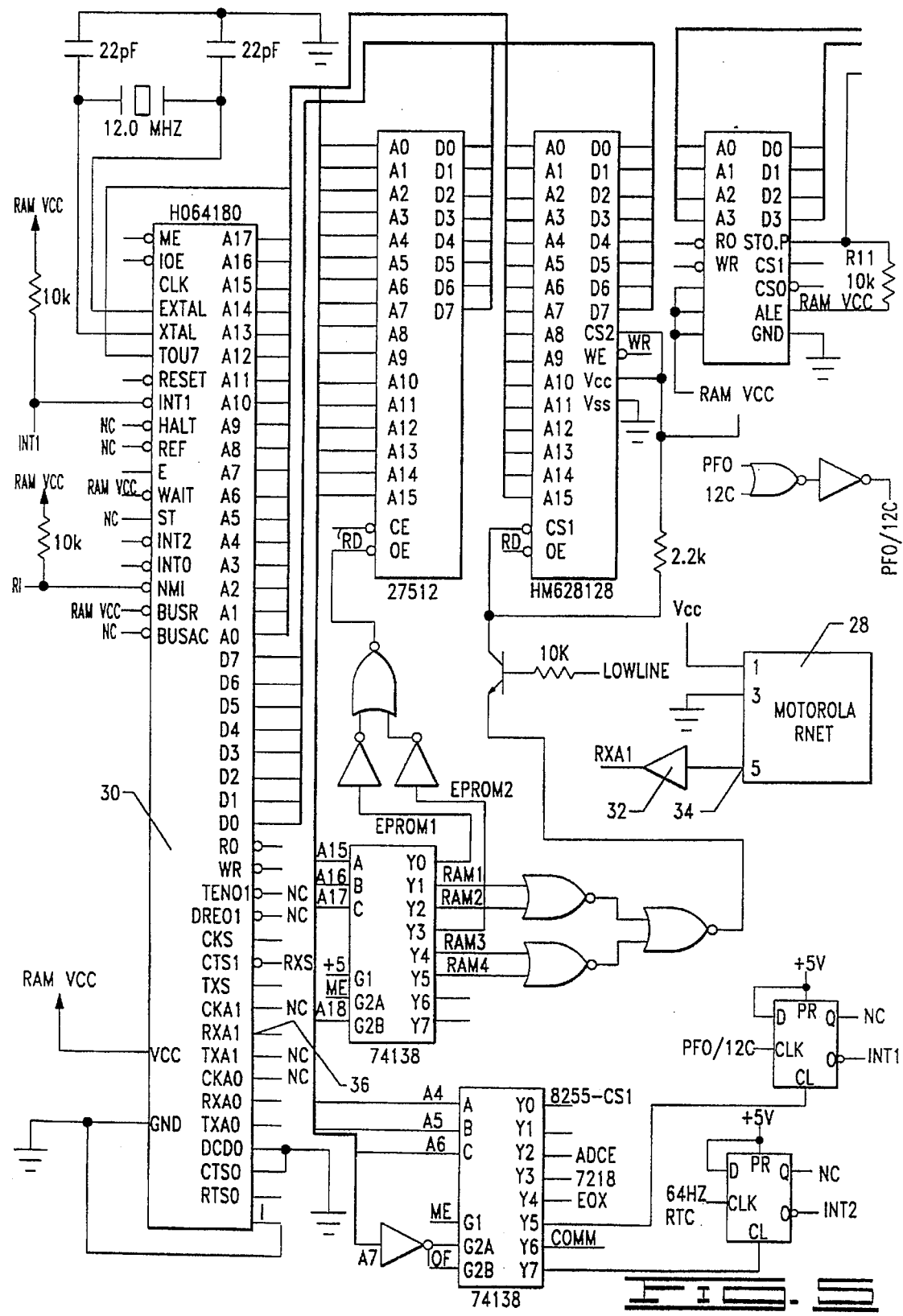
FIG. 5 is a schematic circuit diagram showing the interface between a particular implementation of a paging data receiver and an energy management system shown in FIG. 1.
Figures 5, 5A:
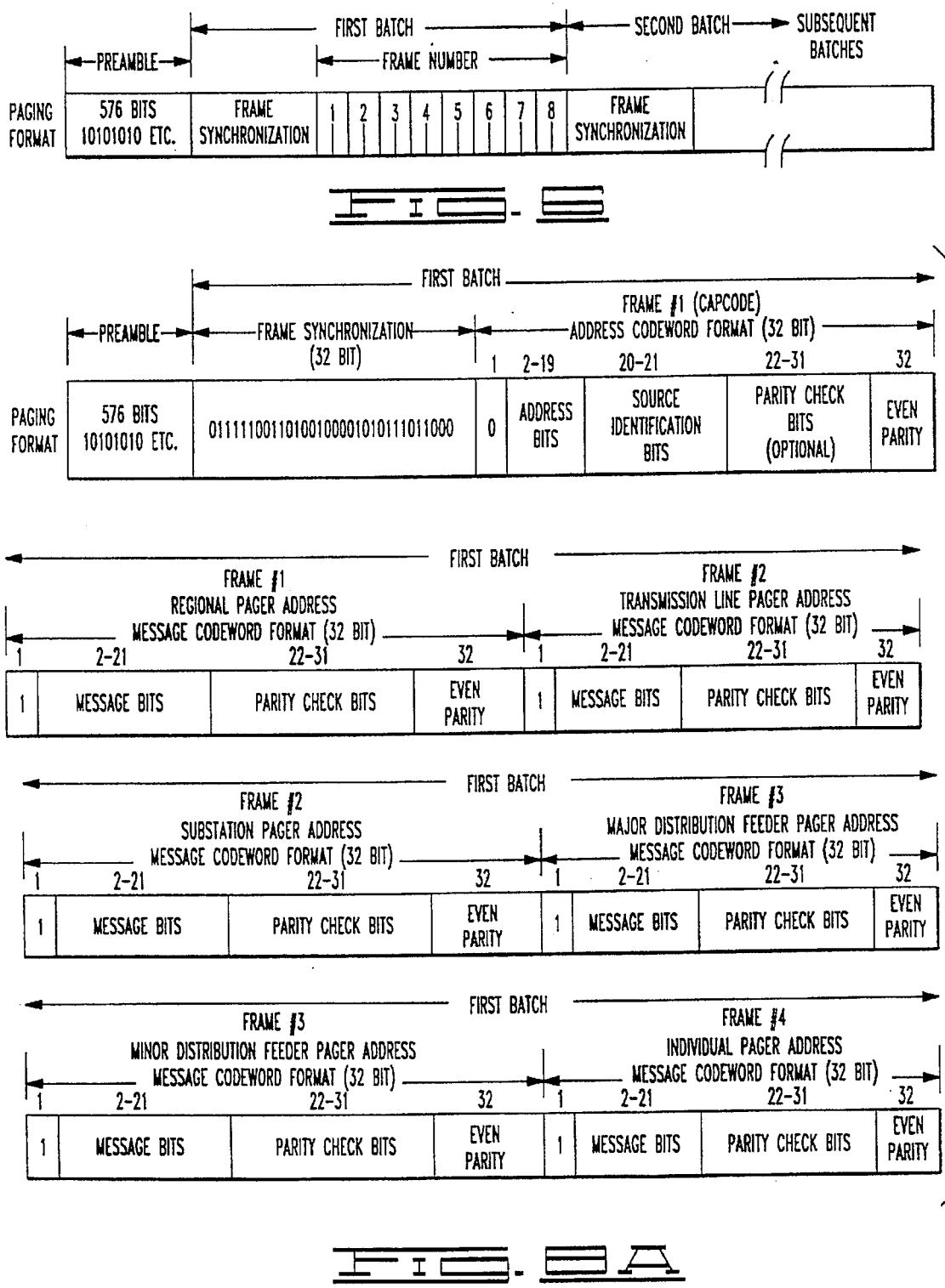

The individual elements described above can be implemented by known equipment. In an exemplary specific implementation of the preferred embodiment, the pager 6 of each apparatus 4 is a Motorola "RNET" paging data receiver, the energy management system 8 is an Excel Energy Technologies, Ltd. model XLT-8000 energy management system, and the elements 16–24 of FIG. 2 are various known types of equipment. A specific implementation using a Motorola "RNET" paging data receiver 28 and a microprocessor 30 of the XLT-8000 energy management system is shown in FIG. 5. These specific devices are not limiting of the present invention as it is contemplated that other devices and interface formats (e.g., parallel versus serial) can be used.

Figure 7:
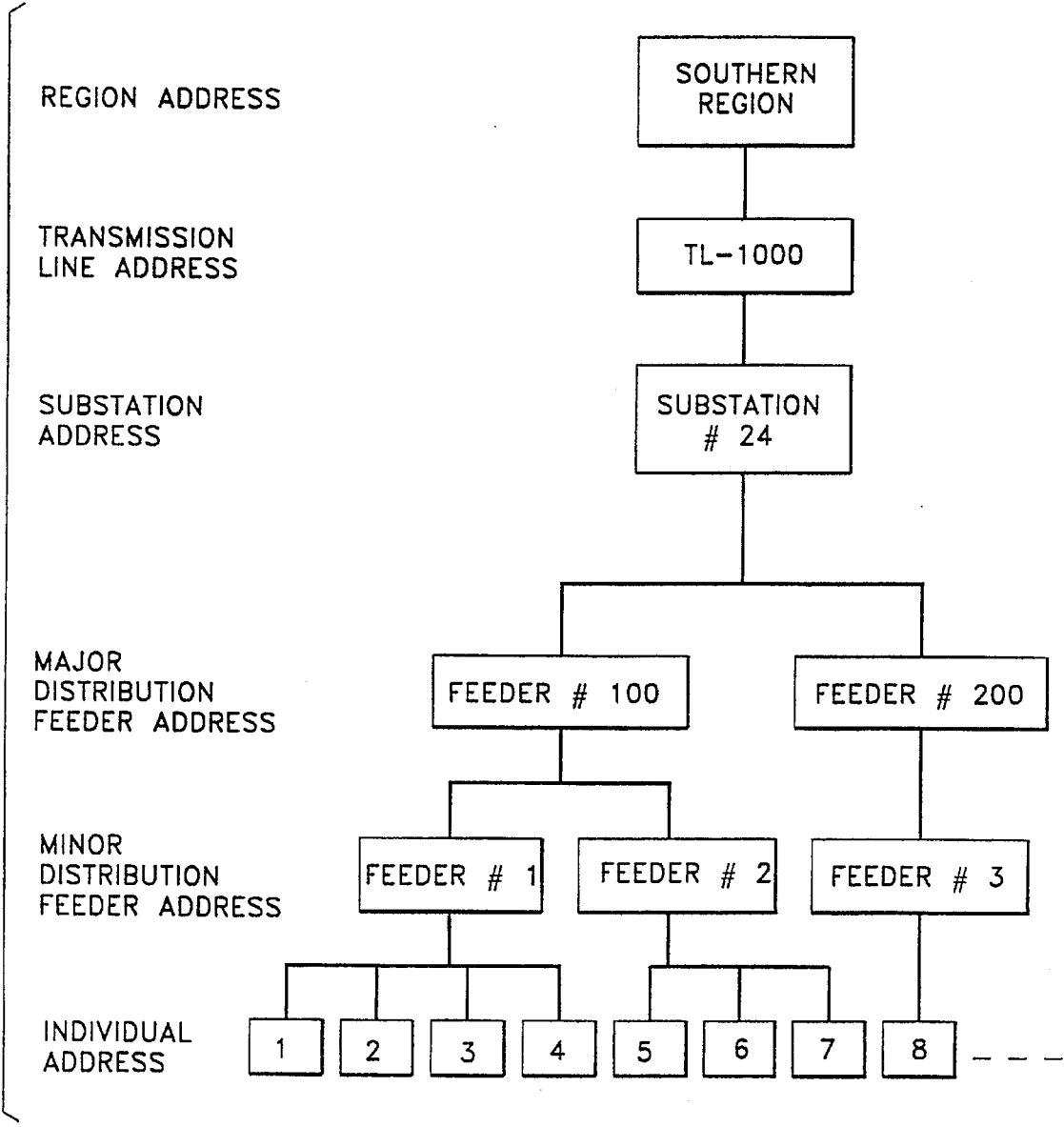
FIG. 7 illustrates a communications hierarchy for addressing one or more energy management systems within an energy utilization control system of the present invention.
Figure 8B:
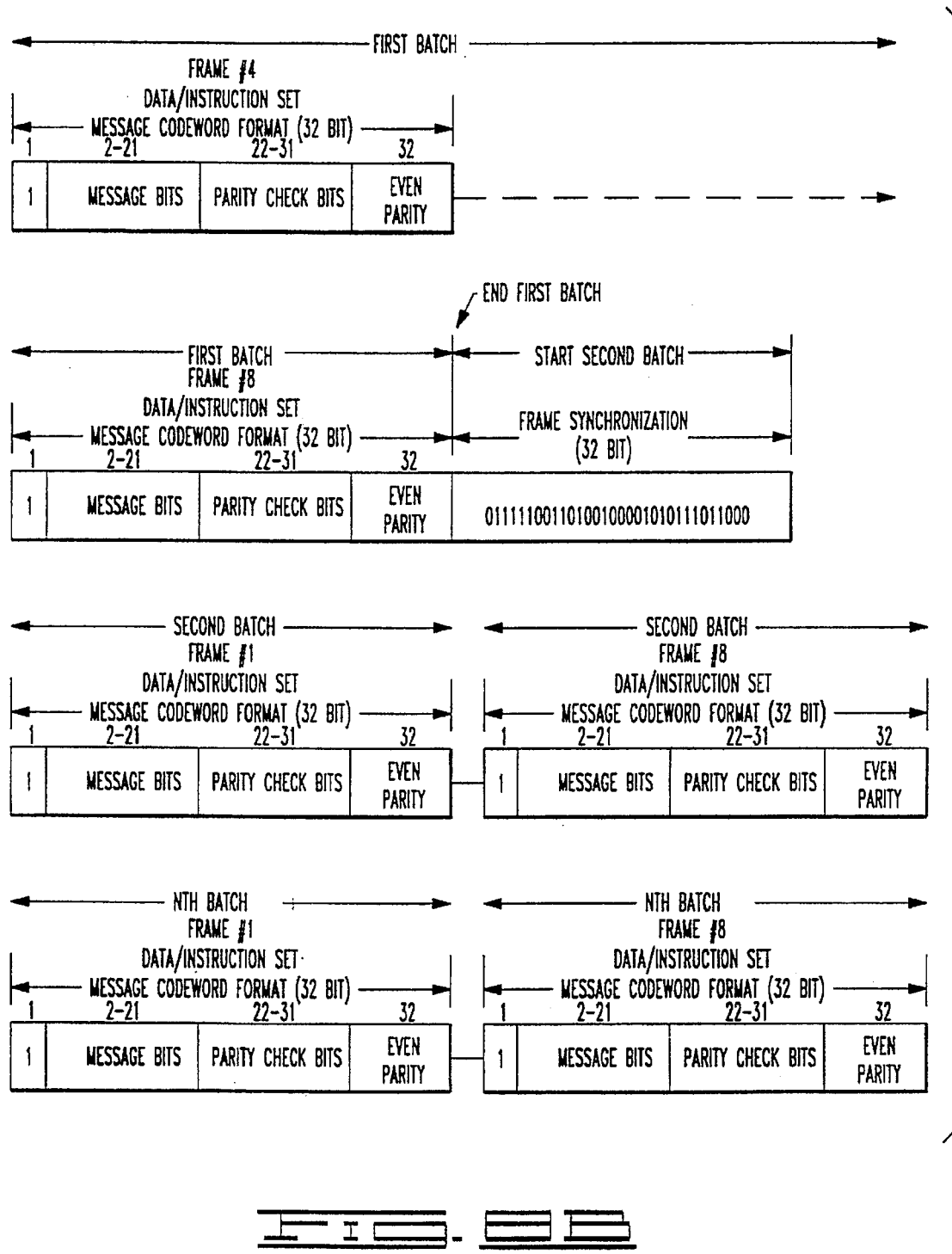

For this particular implementation including the device 28 and the microprocessor 30, reference is made to FIGS. 6–8 and the following explanation to illustrate a code structure to be sent in a remote transmission from the remote transmission system 2 to the energy utilization controller(s) 4 of the present invention.

The Motorola RNET paging data receiver 28 is based on binary coded data using the Post Office Code Standardization Advisory Group (POCSAG) code. The POCSAG code is a synchronous paging format.

Referring to FIG. 6, the POCSAG code includes a "preamble" that is followed by one or more "batches." Each batch comprises a frame synchronization structure followed by eight 64-bit frames. Each frame is subdivided into two 32-bit address, message or idle codewords. The frame synchronization code marks the start of each batch of codewords.

The preamble consists of 576 bits of 101010 pattern transmitted at a rate of 512, 1200, or 2400 bits per second. The decoder mechanism in the device 28 uses this preamble: 1) to determine if data received is a POCSAG signal, 2) for synchronization with the data stream, and 3) to determine baud rate. If this is correct, then the paging data receiver 28 looks for synchronization. The frame synchronization structure is unique and is a reserved 32-bit word. Frame synchronization structure is used to identify the beginning of each batch. The structure is defined as 01111100110100100001010111011000 (see FIG. 8).

Each POCSAG batch consists not only of frame synchronization but also eight frames of two codewords per frame (16 codewords per batch). These codewords can be message, address or idle type codewords. To maintain proper batch structure, each frame includes two address codewords, or two message codewords, or two idle codewords, or an appropriate combination of these three different types.

A POCSAG address codeword's first bit (bit 1) is always zero, bits 2–19 are the address bits where the paging data receiver 28 reviews these bits to find its own address ("capcode"). Each POCSAG address codeword is capable of providing function information from four different paging sources (functions 1–4). These functions are identified in bits 20 and 21, also known as the source identifier bits. Bits 22 to 31 are parity check bits with the 32nd bit being established as the even parity bit. Also, each address codeword contains three bits that are precoded for designation of the frame location in the batch where the receiver's address is to be received. The decoder only looks at codewords in this frame for its address.

A POCSAG message codeword always starts with a one in bit location one (bit 1) and always follows directly after the POCSAG address codeword. Subsequent message codewords follow in the batch until terminated by another POCSAG address codeword or a POCSAG idle codeword.

A POCSAG idle codeword is unique and reserved to take the place of a codeword in any frame that is not otherwise filled with 64 bits. In other words, if the frame contains only one address or one message codeword, the idle codeword is used to fill in or complete the 64-bit frame. The idle codeword structure is as follows: 01111010100010011100000110010111.

To initiate a communication using this POCSAG format within one of the systems illustrated in FIG. 2, for the implementation of FIG. 5, an energy management company or utility sends the telephone number assigned to the paging data receivers 28 followed by message data in compliance with the POCSAG format. The telephone number accesses the commercial paging network 14, which in response generates and sends the POCSAG preamble, the POCSAG frame synchronization and the POCSAG address codeword (i.e., the "capcode") followed by the message data from the sender. The message data is sent as the message codewords of the POCSAG format. When a paging data receiver 28 receives the capcode for which it has been programmed, it becomes a conduit which merely transfers the subsequent transmission directly through itself to the respective microprocessor 30.

As the energy management company or utility issues alphanumeric codes through the system of the present invention, the first set of message codewords are assigned addresses for specific energy utilization controllers 4 which are selected to implement the remotely transmitted control data. As a capcode-responsive device 28 receives data, this data is transferred to the respective microprocessor 30 in a sequential form and loads a message codeword table defined in memory used by the microprocessor 30. For example, the first six message codewords in batch 1 might be used for the following addresses: utility region address, transmission line address, substation address, major distribution feeder address, minor distribution feeder address and individual pager address (see FIGS. 7 and 8). Following these codewords will be the data/instruction sets that will also be issued in message codeword format.

As this data is loaded into a buffer table, each receiving energy management system, using the microprocessor 30, tests the first six message codewords and determines if any of these addresses matches one or more predetermined addresses assigned to and stored in that particular energy utilization controller 4 (more specifically, matching of the received address(es) is performed by comparing it (them) to the predetermined address(es) stored in memory of the energy management system 8).

If, for example, the binary codeword for the utility's region address matches a particular controller's regional codeword address, then the microprocessor 30 of that controller 4, after completing this test, accepts and loads the data/instruction sets into the system memory arrays for further use.

If the region address, transmission line and substation addresses do not correlate with a controller's assigned address(es) but one of the subsequent major/minor distribution feeder or individual addresses does match, then the message codeword batches are accepted and processed by the microprocessor 30. If none of the message codeword addresses matches the address(es) stored in its energy management system 8, then the data/instruction sets are ignored even though they have been received by the microprocessor 30 through an accessed paging data receiver 28.

It is to be noted that other addressing hierarchies can be used. For example, all higher level addresses might be required before a lower level address is deemed valid.

Referring to FIG. 5, the foregoing communication from the paging data receiver 28 to the microprocessor 30 is via the RNET device 28 serial data output port 34 to the asynchronous serial data input port 36 of the microprocessor 30. Conversion from the RS-232 level signal of the device 28 to the TTL level of the particular microprocessor 30 is effected through a voltage level converting buffer 32 having its input connected to the port 34 and its output connected to the port 36 (alternatively, and preferably, a TTL level signal output by the particular device 28 is connected directly to the port 36).

The microprocessor port 36 is an open port with an internal register; as the microprocessor 30 is cycling through its internal instruction/data sets, it is examining this port as data flows in directly from the RNET device 28. This creates a microprocessor interrupt which then services the asynchronous port. The data is then moved from this register and placed into a buffer. This is done one byte at a time. The microprocessor's speed is faster than the data flow from the device 28. As each byte is ported out from the device 28, enough time is provided for the microprocessor 30 to transfer each byte to a buffer for execution by the microprocessor 30. With the speed of the microprocessor 30 much greater than the RS-232 baud rate (9600) of the output port of the device 28, control signals such as Request to Send (RTS) and Clear to Send (CTS) are not required in this system.

Various parameters used by the energy management systems 8 can be changed by remote transmissions received through the respective pagers 6. The following are non-limiting examples of specific parameters susceptible of remote-controlled change in the foregoing specific implementation of the present invention, but these specific parameters are not part of the presently claimed invention in that any type of data can conceivably be communicated via the present invention:

| General Feature | Specific Parameter That Can Be Changed |
| --- | --- |
| 1. programmed setback time and temperature. | 1. zone 2. day of the week 3. period 4. time 5. heat setpoint 6. cool setpoint 7. date |
| 2. efficiency control | 1. zone 2. high 3. low 4. off 5. minimum time on/off |
| 3. temperature sensor offsets | 1. zone 2. temperature sensor offsets |
| 4. phone home limits | 1. temperature sensor channel 2. temperature alarm limit(s) |
| 5. meter accumulation | 1. kwh multiplier for electric meter 2. cubic feet multiplier for gas meter |
| 6. security | 1. personal identification number (pin) |

-continued

| General Feature | Specific Parameter That Can Be Changed |
| --- | --- |
| 7. electric power on/off | 1. disengage electric power |
| 8. time and date | 1. time (hh-mm-sec) 2. date (mo-day-yr) |
| 9. option circuit activation | 1. optional circuit number activation/deactivation |
| 10. temperature drifts | 1. zone 2. temperature drift variable vs. cost |
| 11. update energy management system software via pager to EEPROM | 1. provide data/instruction sets to energy management system via radio frequency pager system |
| 12. direct digital control using proportional, integral and derivative parameters | 1. adjust gain function 2. adjust reset time function 3. adjust derivative time function |
| 13. energy management system "hold" function | 1. temperature setpoint (cool) 2. temperature setpoint (heat) 3. number of days to be in "hold" 4. start day of the week for "hold" 5. start time for "hold" 6. define zone for "hold" 7. hold allowable software switch |
| 14. base load check | 1. time for initiation of base load check 2. zone off priority 3. base load check time duration 4. zone on priority 5. start-up delay time interval |
| 15. zone override | 1. zone number 2. time duration for zone override 3. override heat temperature setpoint 4. override cool temperature setpoint |
| 16. zone heat/cool temperature setpoint offset | 1. zone number 2. increase/decrease the amount of setpoint offset |
| 17. direct digital connection | 1. engage or disengage energy management system enabling firmware routines 2. zone number |
| 18. "I'm OK" phone home | 1. date to start 2. time to start 3. firmware switch for either time duration between "phone home" or time and date for "phone home" 4. daily basis 5. time duration between "phone home" |
| 19. 365 day multi-event exception program | 1. zone number 2. day of the week 3. period (1–7) 4. date 5. time of day 6. heating setpoint 7. cooling setpoint |
| 20. six "phone home" phone numbers and two level phone home distinction | 1. phone #1 2. phone #2 3. phone #3 4. phone #4 5. phone #5 6. phone #6 7. phone # level distinction |
| 21. battery check | 1. initiate battery check |

-continued

| General Feature | Specific Parameter That Can Be Changed |
| --- | --- |
| | firmware |
| 22. input channel 9 software switch | 1. identify temperature sensor input |
| | 2. identify kw pulse input |
| | 3. identify kw analog input |
| 23. heater type | 1. gas |
| | 2. electric |
| | 3. oil |
| 24. zone hysteresis deadband | 1. zone number |
| | 2. increase/decrease zone temperature hysteresis |

Another feature of the preferred embodiments of the present invention is their capability to telephone information to the sending location through the commercial telephone network 12. This is represented in FIGS. 1 and 2 by lines 38. This is implemented using a modem within the energy utilization controller 4 (such as may be implemented internally within the energy management system 8). It is contemplated that data for sending from the controller 4 location to the remote, controlling location in a particular implementation of the energy management system 8 includes:

1. keyboard logging
2. temperature logging
3. program data confirmation
4. elapsed run time of heater, a/c compressor, fan, and option output
5. override logging
6. kwd & kwh meter readings
7. phone home alarm
   a. power outages
   b. voltage dips
   c. freeze protection
   d. heat protection
   e. checksum
   f. "I'm OK"
   g. load control
   h. battery check
8. base load check data
9. pager software logging
10. meter pulse accumulation The foregoing controller and overall system, in their various embodiments, can be used in performing the method of the present invention. This method includes transmitting an energy management system (EMS) addressing code (the hierarchical address(es) of the foregoing particular implementation) and data through the paging network 14 (FIG. 2) or 26 (FIG. 3). Any transmission means, such as those described above, can be used. For example with reference to FIG. 2, the EMS addressing code and data can be transmitted from the computer 16, through the modem 18 to the commercial telephone network 12, and from the commercial telephone network 12 through the commercial paging network 14. Alternatively, the EMS addressing code and data can be transmitted from the hardwired telephone set 20, through the commercial telephone network 12, and from the commercial telephone network 12 through the commercial paging network 14. Still further, transmitting the EMS addressing code and data can be done through the cellular telephone network 24 to the commercial telephone network 12, and from the commercial telephone network 12 through the commercial paging network 14. The private paging network 26 of FIG. 3 can be used. Multiple transmission links as illustrated in FIG. 4 can be used. By whatever technique is used, control data is provided from a remote control site to whichever energy management systems 8 are attuned, via the respective pagers 6, to the transmission. It is used, however, only by those energy management systems 8 for which the programmed EMS addressing code is included in the received data.

In the preferred embodiments, a single pager addressing code is transmitted for a respective control sequence. This allows a single transmission to provide control information substantially simultaneously to all the energy utilization controllers 4 having their pagers 6 preset to the single pager addressing code. In the preferred embodiments, this pager addressing code is the predetermined capcode assigned by the commercial paging network 14 to the telephone number dialed by the sending apparatus. All the paging data receivers 6 that are set to the transmitted pager addressing code automatically transfer the subsequent data to their respective energy management systems 8 when the pager addressing code is received. If this transferred data includes an appropriate EMS addressing code as explained above, the energy management system 8 then acts on the remaining control data.

If an energy management system is to respond to the control data, the operation of energy consuming devices is automatically changed if the received control data so dictates. This occurs by processing received data through a respective energy management system 8 connected to a respective paging data receiver 6 at each of the plurality of sites. Such processing is defined by the specific implementation of the energy management system 8.

Figure 9:
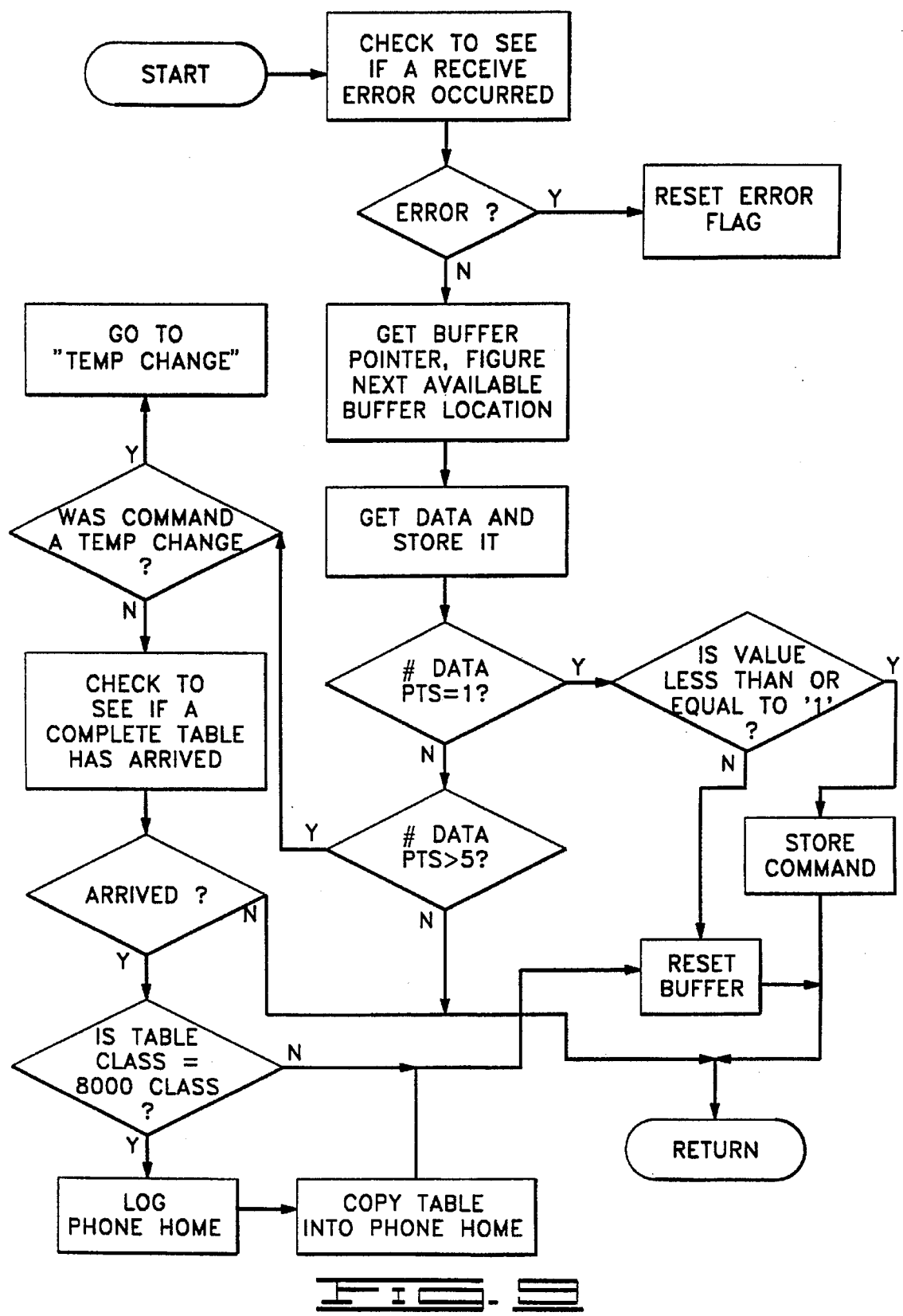
FIG. 9 is a flow chart of a computer program for data utilization within an energy management system of the present invention.

Although such control processing by an energy management system 8 is not specifically a part of the data communication aspect of the present invention, a flow chart for a program for one use of received data is shown in FIG. 9. It is to be noted that in one part of this program, reference is made to "phone home." This indicates that when data is used in this program, responsive data is generated to send back to the site from which the communication through the paging data receivers originated, for example. Examples of data that can be generated and "phoned home" are given above.

Figure 10:
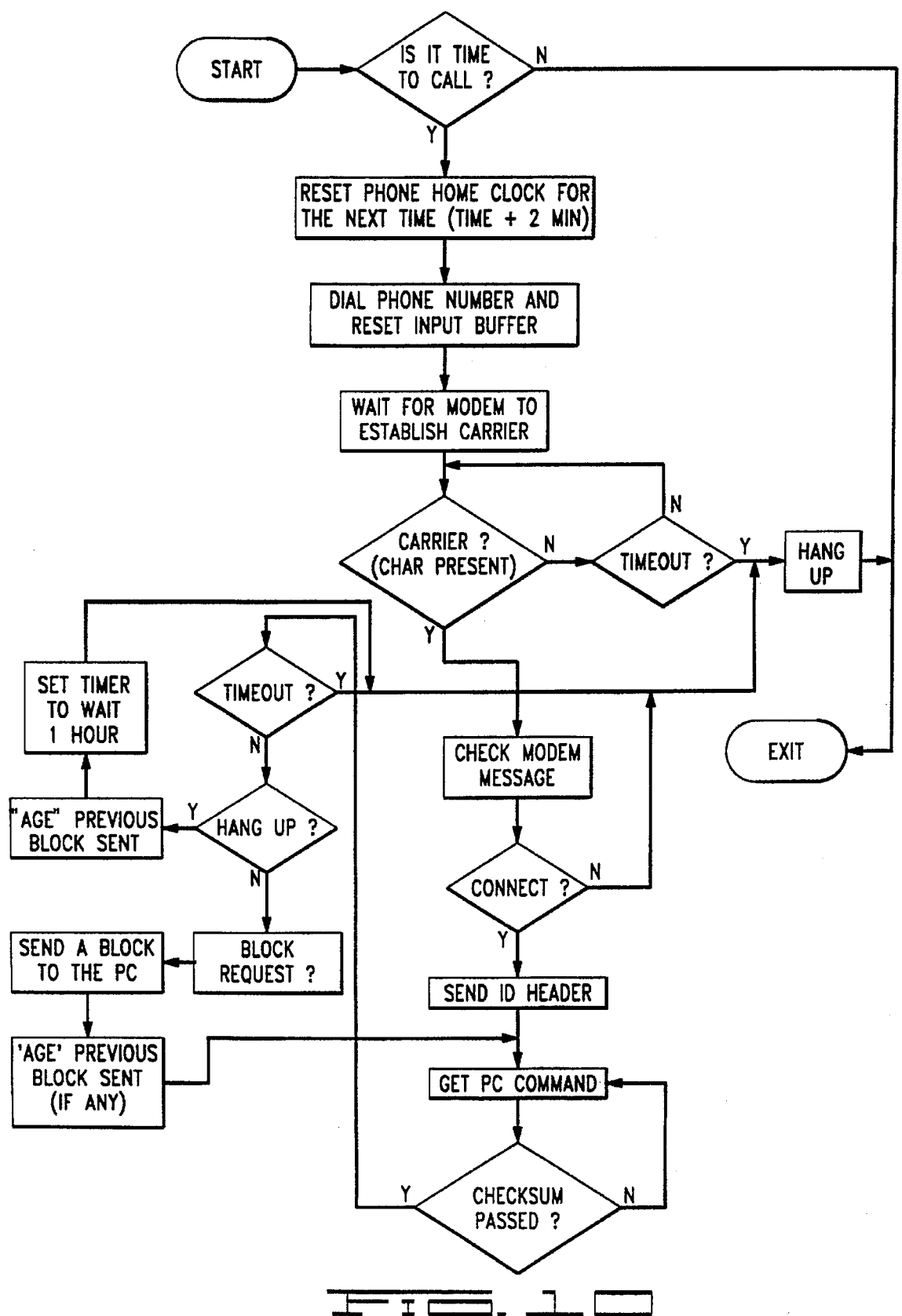
FIG. 10 is a flow chart of a computer program for communicating from an energy management system of the present invention back to a sending site from which pager communications originated.

FIG. 10 is a flow chart of a program by which the aforementioned "phone home" feature can be implemented. This includes two-way communications with a personal computer (PC) at the remote site. This illustrates another aspect of the method of the present invention. This aspect comprises transmitting data, generated in the energy management system 8 in response to using the control data, through the commercial telephone network 12 from the energy management system 8 back to the site remote from the energy management system 8. This can be used to tell the sending location whether the control data has been properly received and used (e.g., whether the pager 4 has malfunctioned or been disabled). It can also be used for other communications to and from the remote site. For example, a telephone call can be automatically placed from the local energy management system 8 to the remote sender in response to a power interruption or brownout, a checksum error detected within the energy management system's memory, a temperature warning (e.g., freezing conditions in a monitored zone, temperature rising above a predetermined setpoint in a freezer, etc.), or a power demand level reaching a predetermined level.

FIG. 11 is a flow chart of a program illustrating a specific use for data received from the remote site through the paging data receiver path of the present invention. This program changes temperature setpoints in the energy management system 8 based on data received through a transmission such as is illustrated in FIG. 8 and as processed through the program of FIG. 9 when the energy management system 8 is addressed by one or more of the six levels of addresses shown in the example of FIG. 7.

The flow chart of FIG. 11 refers to second, third, fourth and fifth characters in a buffer. The second character is data received through the paging data receiver 4, and it defines whether the data of the third and fourth characters is to be used to increment, decrement or replace a preexisting temperature setpoint. The third and fourth characters thus are the numerical values (tens and ones digits) designating the magnitude of the change or the replacement temperature value. The fifth character defines the zone of the temperature controlled space where the change is to be effective. Thus, if the second through fifth characters were "0058" in a particular implementation, for example, this would be interpreted to mean "increment the temperature setpoint by five degrees for zone 8."

Listings for specific programs for the flow charts of FIGS. 9–11 are set forth at the end of this description.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

PROGRAMS

PROGRAMS FOR FIGS. 9 AND 11

```
        rseg    RCODE extern  TTEMPA
        extern  HTEMPA

;Macro GETZONE will return the proper cooling temperature variable (TTEMPX)
;address in IX.
        MACRO   %GETZONE
        LD      A,(\1)          ;Get heat/cool mode
        SUB     30H             ;Convert from ASCII to hex-1 (0..7 vs 1..8)
        CP      0               ;Was it passed cool mode?
        JP      NZ,HEAT         ;Nopa
        LD      IX,TTEMPA       ;Start at first TTEMP location
        JR      CONT            ;Continue processing
HEAT:
        LD      IX,HTEMPA       ;Start at first HTTEMP location
CONT:
        LD      A,(\0)          ;Get zone number
        SUB     31H             ;Convert from ASCII to hex-1 (0..7 vs 1..8)
        LD      D,40D           ;TTEMPXs for all zones are 40 bytes apart
        LD      E,A             ;Load up zone number
        MLT     DE              ;Calculate full offset
        ADD     IX,DE           ;IX has adr of proper zones' TTEMP
        ENDMAC ;Macro PAGER_INC will increment the TTEMPX and MEMTTEMPX temperatures
;by the amount sent to the macro.
        MACRO   %PAGER_INC
        LD      C,\0            ;Get temperature to increment by
        LD      A,(IX)          ;Get TTEMPX
        ADD     A,C             ;Add entered temp to TTEMPX
        LD      (IX),A          ;Put back into TTEMPX
        LD      BC,17D          ;Load offset for MEMTTEMPX
        ADD     IX,BC           ;Get new MEMTTEMPX address
        LD      (IX),A          ;Write new temp to MEMTTEMPX
        ENDMAC ;Macro PAGER_DEC will decrement the TTEMPX and MEMTTEMPX temperatures
;by the amount sent to the macro. Essentially the same routine as
;PAGER_INC.
        MACRO   %PAGER_DEC
        LD      C,\0            ;Get temperature to decrement by
        LD      A,(IX)          ;Get TTEMPX
        SUB     C               ;Subtract entered temp from TTEMPX
        LD      (IX),A          ;Put back into TTEMPX
        LD      BC,17D          ;Get offset for MEMTTEMPX
        ADD     IX,BC           ;Point IX to MEMTTEMPX
        LD      (IX),A          ;Write new temp to MEMTTEMPX
        ENDMAC ;Macro PAGER_REPLACE will replace TTEMPX and MEMTTEMPX with the sent
;temperature.
        MACRO   %PAGER_REPLACE
        LD      A,\0            ;Get temp to replace TTEMPX
        LD      (IX),A          ;Replace the temperature
        LD      BC,17D          ;Get offset for MEMTTEMPX
        ADD     IX,BC           ;Make IX point to MEMTTEMPX
        LD      (IX),A          ;Write new temp to MEMTTEMPX
        ENDMAC
```

```
$8zioloc
$macros.inc
        rseg    RCODE;
        extern  CBUFWP;
        extern  CBUF;
        extern  CBUFRP;
        extern  RCHARA;
        extern  ALARMCODE
        extern  CBUF1
        extern  CBUFRP1
        extern  PAGER_COMMAND
        extern  rtp_message
        extern  PETDOG
        extern  RTP_CHECKSUM ;...SERIAL INTERRUPT:
ASYNC1:
        public ASYNC1;
        PUSH AF
        PUSH HL
        PUSH BC
        PUSH DE IN0     A,(STAT0)
        BIT     7,A              ;HAVE REC DATA?
        CALL    NZ,STCBUF        ;YES, GET AND STORE
        IN0     A,(STAT0)
        AND     70H              ;ERRORS?
        JP      Z,ASCIOUT        ;NO, OUT
        IN0     A,(CNTLA0)       ;YES
        RES     3,A              ;0 TO EFR
        OUT0    (CNTLA0),A       ;CLEAR ERRORS

ASCIOUT:

public ASCIOUT;
        POP DE
        POP BC
        POP HL
        POP AF
        EI
        RET

;...SERIAL INTERRUPT2:
```

```
SIZEOF_RTP  EQU  230

ASYNC2:
        PUSH IX
        PUSH IY
        PUSH AF
        PUSH HL
```

—26—

```
        PUSH    BC
        PUSH    DE
        public  ASYNC2;
STCBUF1:
        INO     A,(STAT1)
        BIT     7,A             ;HAVE REC DATA?
        JR      NZ,PAGEBUF1     ;YES, GET AND STORE
        INO     A,(STAT1)
        AND     70H
        JP      Z,ASCIOUT       ;ERRORS?
        INO     A,(CNTLA1)      ;NO, OUT
        RES     3,A             ;YES
        OUTO    (CNTLA1),A      ;0 TO EFR
        JP      LESSTHAN6       ;CLEAR ERRORS
PAGEBUF1:                       ;get out
        LD      A,(CBUFRP1)     ; process the character.
        INC     A
        LD      (CBUFRP1),A
        LD      D,0
        LD      E,A
        LD      HL,CBUF1
        ADD     HL,DE
        INO     A,(RDR1)        ;GET DATA FROM UART1
        LD      (HL),A          ;STORE IN BUF
        LD      E,A             ;Do a checksum.  Save the data byte....
        LD      A,(RTP_CHECKSUM);Get the current checksum...
        ADD     A,E             ;Add it..
        LD      (RTP_CHECKSUM),A;and save it.
        LD      A,(CBUFRP1)
        CP      1
        JP      Z,SETCOMMAND    ;Process the command
        CP      5
        JP      C,LESSTHAN6     ;less than 5 chars in buff
; at this point we COULD have a legitimate command in the buffer,
; so let's see if we do....
        LD      A,(PAGER_COMMAND)
        CP      48              ;Is it a '0'?
        JP      Z,SETTEMP       ;This is a temp change- process that
        CP      49              ;Is it a '1'?
        JP      Z,RTPTEST       ;This might be a RTP table- we'll see...
        JP      ZEROBUFFER      ;Something's wrong- we ignore this transmission
; Nope- we're not looking for a settemp- wait 'till we have enuf chars
; for a RTP table...
RTPTEST:
        LD      A,(CBUFRP1)
        CP      SIZEOF_RTP      ;check to see if we've got enuf characters
        JP      NZ,LESSTHAN6    ;Nope- continue on JP      PROCTABLE       ;Yup- take care of it!
; Process Kelley's original command......
SETTEMP:
        LD      A,0             ;4 chars in buff, zero out read pointer
        LD      (CBUFRP1),A     ;Write read pointer
        %GETZONE CBUF1+5,CBUF1+6;Make IX point to proper TTEMP value
MAKENUM:
        LD      A,(CBUF1+3)     ;Load 3rd char into A
        SUB     30H             ;Change from ASCII to hex
        SLA     A
        SLA     A
        SLA     A
        SLA     A               ;Stuff into upper nibble
        LD      B,A             ;Save it
        LD      HL,CBUF1+4      ;Get 4th char
        LD      A,(HL)          ;Load into A
        SUB     30H             ;Change from ASCII to hex
        LD      (HL),A          ;Put back
        LD      A,B             ;Restore A
        OR      (HL)            ;Make a two digit HEX number
        LD      B,A             ;Save A
        LD      A,(CBUF1+3)     ;Get first digit
        SUB     30H             ;Change from ASCII to decimal
        LD      D,6             ;Load D with ones digit
        LD      E,A             ;Load E with MS digit
        MLT     DE              ;Multiply the two
        LD      A,B             ;Restore original hex temp entered
        SUB     E               ;Get decimal number & put into A
        LD      B,A             ;Save it
CHECKOP:
        LD      A,(CBUF1+2)     ;Fetch operation
        CP      30H
        JP      Z,DECREMENT
        CP      31H
        JP      Z,INCREMENT REPLACE:
        %PAGER_REPLACE B
        JP      LESSTHAN6       ;The end
DECREMENT:
        %PAGER_DEC B
        JR      LESSTHAN6       ;The end
INCREMENT:
        %PAGER_INC B
        JR      LESSTHAN6       ;The end
SETCOMMAND:
        LD      A,(HL)          ;Fetch the command
        CP      50              ;See if it's a legit command ('1'=highest legal cmd)
        JP      P,ZEROBUFFER    ;Nope- trash it!
        LD      (PAGER_COMMAND),A ;Else store it
```

-27-

```
                              checksum
        LD      A,0
        LD      (RTP_CHECKSUM),A    ;clear the      storage
        LD      (RTP_CHECKSUM+1),A
        JR      LESSTHAN6           ;Thats it for now...
PROCTABLE:
        CALL    rtp_message         ;Transfer the data into Phonehome and clear the buf
ZEROBUFFER:
        LD      A,0
        LD      (CBUFRP1),A
LESSTHAN6:
        POP DE
        POP BC
        POP HL
        POP AF
        POP IY
        POP IX
        EI
        RET
;***********************************************************************

STCBUF: LD      A,(CBUFWP)      ;GET WRITE PNTR
        public STCBUF;
        INC     A               ;BMP PTR, MODULO 256
        LD      (CBUFWP),A      ;SAVE
        LD      D,0
        LD      E,A             ;PTR TO DE
        LD      HL,CBUF
        ADD     HL,DE           ;ADD PTR
        IN0     A,(RDR0)        ;GET DATA FROM UART0
        LD      (HL),A          ;STORE IN BUF
        RET ;READ A POINT FROM THE BUFFER:
;(CALLED FROM MODEMCOM)
;POINTER-CBUFRP
;PTR POINTS TO LAST CHAR READ RDBUF:  LD      A,(CBUFRP)      ;GET READ PNTR
        public RDBUF;
        INC     A               ;BUMP PTR, MOD 256
        LD      (CBUFRP),A      ;SAVE PTR
        LD      D,0
        LD      E,A
        LD      HL,CBUF
        ADD     HL,DE           ;ADD PNTR
        LD      A,(HL)          ;READ THE CHAR
        RET ;................................
;...THIS ROUTINE LIKE SCANW AND SCANR
SCANW:
        public SCANW;
        DI
        LD      A,(CBUFWP)      ;WRITE PNTR
        LD      B,A             ;TO B
        LD      A,(CBUFRP)      ;RD PNTR
        EI
        CP      B               ;EQUAL?
        RET SCANRD: DI
        public SCANRD;
        CALL    RDBUF           ;READ A CHAR FROM BUFFER
        EI
        LD      (RCHARA),A
        RET                     ;RETURN WITH CHAR IN A
                                ;AND RCHARA RESETPOINTERS:
        public RESETPOINTERS;
        LD      A,0
        DI
        LD      (CBUFRP),A
        LD      (CBUFWP),A
        EI
        RET RESETPAGER:
        public RESETPAGER;
        LD      A,0
        DI
        LD      (CBUFRP1),A
        EI
;       LD      A,0
;       LD      (SKIP_MODE),A   ;clear the skip mode flag
        RET
                end
```

-28-

PROGRAMS FOR FIG. 10

```
$8zioloc
        rseg    CODE
        extern  DATASENTFL
        extern  HLOGBUF
        extern  HBUFSTART

;...MAKE DATA JUST READ OLD BY ADDING 100 TO
;THE MONTH ENTRY:

MAKEOLD:
        public  MAKEOLD;
        LD      A,(DATASENTFL)
        AND     A               ;ANY WAS DATA SENT YET?
        RET     Z               ;NO, JUST RETURN
                                ;YES, MAKE IT OLD

LD      HL,(HLOGBUF);GET THE POINTER

LD      B,128           ;NO PTS

;LOOK THE ERROR CODE LOGGED IN THE TABLE:
; NOTE this table is also in PHONEFIX.H- change one, change both!
FINDCODE:
        CALL    MOLDRDPT        ;GET A POINT FROM BUFFER
        DEC     B
        CP      252             ;POWER OUT?
        JP      Z,ADD100        ;YES
        CP      251             ;CKSUM ERR?
        JP      Z,ADD100        ;YES
        CP      250             ;RTP TABLE?
        JP      Z,ADD100        ;YES
        CP      249             ;HVAC ALERT?
        JP      Z,ADD100        ;YES
;       CP      248             ;KW DEMAND?
;       JP      Z,ADD100        ;YES
;       CP      247             ;KW DEMAND?
;       JP      Z,ADD100        ;YES
FINDCODE1:
        public  FINDCODE1;
        LD      A,0
        CP      B               ;ALL DONE?
        JP      NZ,FINDCODE ;NO
                                ;YES, FINISHED
        LD      A,0
        LD      (DATASENTFL),A  ;CLEAR THE DATASENT
                                ;FLAG
        RET ADD100:
        public  ADD100
;       LD      A,0             ;NEED AT LEAST ONE PT LEFT
;       CP      B               ;HAVE IT?
        LD      D,H
        LD      E,L
        INC     DE A100:   LD      A,(DE)          ; GET PREVIOUS CHARACTER
        public  A100;

INC     B               ;INC CNTR SINCE WE BACKED UP ONE PT
        CP      100             ;ALREADY MADE OLD?
        JP      NC,FINDCODE1 ;YES
        ADD     A,100           ;NO, ADD 100 TO MONTH
        LD      (DE),A          ;PUT BACK
        CP      113             ;MONTH STILL IN RANGE?
        JP      C,FINDCODE1 ;YES, OK
        LD      A,100           ;NO, MAKE 100
        LD      (DE),A          ;STORE 100
        JP      FINDCODE1       ;RETURN

;INC POINTER AND READ A POINT FROM THE BUFFER:
MOLDRDPT:
        public  MOLDRDPT;
        DEC     HL
        LD      A,(HL)
        CP      253
        JP      NZ, BACK
        LD      HL, (HBUFSTART)   ; RESET THE POINTER
BACK:
        RET end
```

$8zioloc

```
        rseg    CODE
        extern  HEC
        extern  IDCNT
        extern  DATAREADY
        extern  DCDTO
        extern  CBUFWP
        extern  CBUFRP
        extern  HSTVEC
        extern  BLOCKNO
        extern  CBUF
        extern  CKSUMH
        extern  CKSUML extern  CTO
        extern  FLAGBITA
        extern  TEMPZONE extern  TDATE
        extern  TDAY
        extern  THR
        extern  TMIN
        extern  TCKSUM
        extern  HOMEPHON
        extern  MRESET
        extern  ATE0
        extern  ATV0
        extern  ATH
        extern  ATS0
        extern  RCHARA
        extern  TNBYTES extern  WAIT1_1
        extern  RESETPOINTERS
        extern  TSTRING
        extern  DELAY200
        extern  AUTOANS
        extern  TRANS
        extern  SCANW
        extern  SCANRD
        extern  MAKEOLD
        extern  RDHOMEDAT
        extern  TCK
        extern  TIME
        extern  PETDOG
        extern  SerialNum
        extern  HVAC_ALERT_FLAG

ETX:    EQU     03

;............................................

;CALL HOME FOR ALARM CONDITION:
HOMEST:DEFM    '18004932686'    ;EXCEL NO. (800) 493-2686
;HOMEST:DEFM   '4932648'        ; alternate phone -
       DEFB    0DH HOME:                   ;SUBROUTINE
        public  HOME;
        LD      A,(TMIN)     ; first reset the clock to a default timeout
        ADD     A,2          ; reset so PHCHK is checked again in 2 min
        CP      60
        JP      M,CONTINUE1  ; it'll jump only if A was originally 0
        SUB     60
CONTINUE1:
        LD      (TIME),A     ; save the new time ;............CLEAR CBUF FOR MODEM INPUT:....
        LD      B,255        ;FOR 255 LOCATIONS
        LD      HL,CBUF
        LD      A,0
CBUFCL:
        LD      (HL),A
        INC     HL
        DJNZ    CBUFCL ;..INITIALIZATION:..........................
        LD      A,0
        LD      (HEC),A      ;CLR ERROR CODE
        LD      (IDCNT),A    ;CLR ID SEND COUNTER
```

-30-

```
            LD      HL,HST0
            LD      (HSTVEC),HL   ;INIT STATE VECTOR
            CALL    RESETPOINTERS ;READ & WRITE PNTRS

;TRANSFER HOMEST NUMBER IN ROM TO RAM FOR TEST:
            LD      HL,HOMEST
            LD      DE,HOMEPHON
            LD      BC,20
            LDIR
ORIGINATE:
            LD      A,'+'         ;+++ ESCAPE
            CALL    TRANS
            LD      A,'+'
            CALL    TRANS
            LD      A,'+'
            CALL    TRANS
            CALL    WAIT1_1
            CALL    WAIT1_1

LD      HL,ATH
            LD      B,3
            CALL    TSTRING       ;HANG UP
            CALL    DELAY200      ;LONG DELAY

LD      HL,ATE0       ;DON'T ECHO
            LD      B,4
            CALL    TSTRING
            CALL    DELAY200      ;LONG DELAY

LD      HL,ATV0       ;DIG CODES
            LD      B,4
            CALL    TSTRING
            CALL    DELAY200      ;LONG DELAY

LD      HL,ATX3       ;BL DIAL
            LD      B,4
            CALL    TSTRING
            CALL    DELAY200      ;LONG DELAY

LD      HL,ATS7_60    ;WAIT FOR DCD 60SEC
            LD      B,7
            CALL    TSTRING
            CALL    DELAY200      ;LONG DELAY

LD      HL,ATS11_55   ;DTMF SPEED
            LD      B,8
            CALL    TSTRING
            CALL    DELAY200      ;LONG DELAY

;..dial number:
            LD      A,'A'
            CALL    TRANS
            LD      A,'T'
            CALL    TRANS
            LD      A,'D'
            CALL    TRANS
            LD      A,'T'
            CALL    TRANS         ;SEND ATDT
            LD      HL,HOMEPHON   ;HOME PHONE NO
            LD      B,40          ;MAX NO CHARS
DIALLOOP:
            LD      A,(HL)
            CALL    TRANS
            CP      0DH           ;CAR RET?
            JR      Z,DIAL0       ;YES, FINISHED
            INC     HL
            DJNZ    DIALLOOP      ;LOOP BACK, 40 MAX
            LD      A,0DH         ;this is here just in case we go beyond 40 chars
            CALL    TRANS         ;(which we really shouldn't as that would be an error)
DIAL0:
            public  DIAL0;

DI
            LD      A,30          ;SET TIME OUT TO 30S
            LD      (DCDTO),A
            EI                    ;REINABLE INTERRUPT
;..CLEAR RECEIVER:
            LD      A,(CBUFWP)    ;CLEAR REC BY MAKING
            LD      (CBUFRP),A    ;RD PNTR = WR PNTR

;..WAIT FOR "CONNECT" OR UNTIL T.O.:
;OK=0, CONNECT=1, RING=2, NO CARRIER=3, ERROR=4
;CONN 1200=5, NO DIALTONE=6, BUSY=7
;NO ANSWER=8, CONNECT 2400=10.
WCONN:
            public  WCONN
;WAIT FOR "CONNECT"
            CALL    PETDOG
            CALL    SCANW         ;CHAR READY?
            JP      NZ,WCONN1     ;YES
            LD      A,(DCDTO)     ;NO, CK T.O.
            AND     A             ;ZERO?
            JR      NZ,WCONN      ;NO, WAIT SOME MORE
                                  ;YES, ERROR RETURN
```

-31-

```
                LD      A,03BH
                LD      (HEC),A
                JP      ERR_RET         ;PUT IN ERROR COL
                                        ;HANG UP & RETURN
WCONN1:
        public  WCONN1;
                CALL    SCANRD          ;GET CHAR
                CP      31H             ;CONNECT?
                JP      Z,SNDALARM      ;YES, SEND MESSAGE
                CP      35H             ;CONNECT 1200?
                JP      Z,SNDALARM      ;YES, SEND MESSAGE
                CP      3AH             ;CONNECT 2400?
                JP      Z,SNDALARM      ;YES, SEND MESSAGE
                                        ;NONE, COMM ERROR!
;NO CARRIER-33H, NO ANS-38H, NO DIALTONE-36H
;BUSY SIG-37H, 30 SEC TIME OUT-3BH
ERR_RET:
        public  ERR_RET;
;               LD      (HEC),A         ;STORE ERR CODE
                CALL    HHANGUP
                CALL    DELAY200;
                LD      HL,ATS0         ;ATS0-1,AUTO ANSWER
                LD      B,6
                CALL    TSTRING
                CALL    DELAY200
                RET SNDALARM:
        public  SNDALARM;
                JP      SENDDATALOOP
                RET ATS0_0:   DEFM  'ATS0-0'    ;TURN OFF AUTO ANS
ATF1X3:   DEFM  'ATF1X3'    ;FULL DUPLEX, BLIND DIAL
                            ;EN BUSY DET BUT NOT DIAL TONE
ATS7_60:  DEFM  'ATS7-60'   ;
ATS11_55: DEFM  'ATS11-55'
ATX3:     DEFM  'ATX3'      ;BLIND DIAL

;.........................................
SENDDATA:

SENDDATALOOP:

CALL    HSTATE
                JP      SENDDATALOOP

;...THE STATE MACHINE:

HSTATE:
                LD      HL,(HSTVEC)
                JP      (HL)

;....STATES: ......
;TRANSMIT ID THEN GO TO STATE1:
;TRANSMITS ID UP TO 3 TIMES UNTIL IT RECEIVES
;A 'P'.  AFTER RECEIVING P, THE UNIT IS IN
;SLAVE MODE.

HST0:
                LD      A,0
                OUT     (0B0H),A

CALL    TRANSID
GOHST1:LD       HL,HST1
                LD      (HSTVEC),HL
                DI
                LD      A,30            ;SET TIME OUT TO 10S
                LD      (DCDTO),A
                EI                      ;REINABLE INTERRUPT
;               CALL    SETLHTO         ;SET LONG CHAR TIME OUT

RET

;WAIT FOR "P":
HST1:
        public  HST1;
                LD      A,1
                OUT     (0B1H),A CALL    PETDOG
                CALL    SCANW           ;SEE IF HAVE REC'D A CHAR
                JP      Z,H1CKTO        ;NO, CHECK TIME OUT
                CALL    SCANRD          ;YES, GET CHAR
                CP      'P'             ;"P"?
                RET     NZ              ;NO
                LD      HL,HST2         ;YES
                LD      (HSTVEC),HL     ;-> STATE 2
                CALL    SETHTO          ;SET CHAR TIME OUT
                RET
```

-32-

```
H1CKTO:                         ;HST1 CK TIME OUT
         LD      A,(DCDTO)      ;NO, CK T.O.
         AND     A              ;ZERO?
;        JR      NZ,WCONN       ;NO, WAIT SOME MORE
;        CALL    CKCTO          ;CHAR TIMED OUT?
         RET     NZ             ;NO
                                ;YES
;..TIMED OUT:
CKIDCNT: public  CKIDCNT
         LD      A,(IDCNT)      ;ID SENT 3 TIMES?
         CP      3
         JP      M,GOHSTO       ;NO, ->0 & SEND AGAIN
GOHANGUP:                       ;YES, GO TO HANGUP
         LD      HL,HANGUPST    ;HANGUP STATE
         LD      (HSTVEC),HL
         RET GOHSTO:                         ;GO TO STATE 0
         LD      HL,HSTO
         LD      (HSTVEC),HL
         RET ;..HAVE P, NOW GET 2ND CHAR:
HST2:
         PUBLIC  HST2;
         LD      A,2
         OUT     (0B1H),A CALL    SCANW          ;HAVE A CHAR?
         JP      NZ,HST2A       ;YES
         CALL    CKCTO          ;TIMED OUT?
         RET     NZ             ;NO
         JP      CKIDCNT        ;YES, RE-SEND ID
;        JP      GOHST1         ;YES, GO BK, WAIT FOR P
;....
HST2A:   CALL    SCANRD         ;GET CHAR
         CP      'D'            ;D FOR DISCONNECT?
         JP      NZ,FOURNXT     ;NO, FOUR NEXT
         LD      HL,HST3        ;YES, -> STATE3
         LD      (HSTVEC),HL
         CALL    SETHTO         ;SET CHAR TIME OUT
         RET FOURNXT:
         LD      HL,HST4        ;GO TO STATE 4 NXT
         LD      (HSTVEC),HL
         CALL    SETHTO         ;SET CHAR TIME OUT
         RET
;....
;GET ETX (AFTER RECEIVING 'D'):
HST3:
         public  HST3
         LD      A,3
         OUT     (0B2H),A CALL    SCANW          ;HAVE A CHAR?
         JP      NZ,HST3A       ;YES
         CALL    CKCTO          ;NO, CHECK FOR TIMEOUT RET     NZ
         LD      HL,GOHANGUP    ;TIMED OUT
         LD      (HSTVEC),HL    ;
         RET ;......NOTE: WE SHOULD SEND AN ACK BACK AFTER
;            RECEIVING HANG UP COMMAND.
HST3A:
         CALL    SCANRD         ;GET CHAR
         CP      ETX            ;ETX?
         JP      NZ,GOHANGUP    ;NO, HANGUP WITHOUT
                                ;MAKING DATA OLD--RESEND
                                ;LATER!
         LD      A,0
         LD      (DATAREADY),A  ;INDICATE A SUCCESSFUL SEND
         LD      IX,HVAC_ALERT_FLAG ;prepare to do a loop
         LD      C,17           ;for 16 zones/channels +1
LOOPA    LD      A,(IX)         ;clear out the alerts
         CP      2
         JR      NZ,CONT        ; but only clear those alerts that have a 2
         XOR     A              ; turn it into a 0
         LD      (IX),A         ; and shove it back in
CONT     INC     IX
         DEC     C
         JP      NZ,LOOPA
         LD      A,(TMIN)
         ADD     A,59           ; reset so PHCHK is checked again in 59 min
         CP      60
         JP      M,CONTINUE     ; it'll jump only if A was originally 0
         SUB     60
CONTINUE:
         LD      (TIME),A       ; save the new time
         CALL    MAKEOLD        ;YES, MAKE DATA SENT OLD
                                ;IF ANY WAS SENT YET
         CALL    GOHANGUP       ;TO HANGUP STATE
         RET
```

```
;GET BLOCK #:
HST4:
        LD      A,4
        OUT     (0B3H),A

LD      A,(RCHARA)      ;GET PREV'LY REC'D CHAR
        LD      (BLOCKNO),A     ;STORE IN BLOCK NO
        LD      HL,HST5         ;-> STATE 5
        LD      (HSTVEC),HL
        CALL    SETHTO          ;SET CHAR TIME OUT
        RET

;..GET CKSUMH:
HST5:
        LD      A,5
        OUT     (0B4H),A

CALL    SCANW           ;HAVE A CHAR?
        JP      NZ,HST5A        ;YES
        JP      CKCTO           ;NO, CHECK FOR TIMEOUT
        RET     NZ              ;NOT TIMED OUT
        JP      CKIDCNT         ;YES, RE-SEND ID
;       JP      GOHST1          ;TIMED OUT--WAIT FOR P

HST5A:
        CALL    SCANRD          ;GET REC'D CHAR
        LD      (CKSUMH),A      ;TO CKSUMH
        LD      HL,HST6
        LD      (HSTVEC),HL
        CALL    SETHTO          ;SET CHAR TIME OUT
        RET

;GET CKSUML:
HST6:
        LD      A,6
        OUT     (0B5H),A

CALL    SCANW           ;HAVE A CHAR?
        JP      NZ,HST6A        ;YES
        JP      CKCTO           ;NO, CHECK FOR TIMEOUT
        RET     NZ              ;NOT TIMED OUT
        JP      CKIDCNT         ;YES, RE-SEND ID
;       JP      GOHST1          ;TIMED OUT--WAIT FOR P

HST6A:
        CALL    SCANRD          ;GET REC'D CHAR
        LD      (CKSUML),A      ;TO CKSUML
        LD      HL,HST7
        LD      (HSTVEC),HL     ;TO STATE 7
        CALL    SETHTO          ;SET CHAR TIME OUT
        RET

HST7:
        LD      A,7
        OUT     (0B6H),A

CALL    SCANW           ;HAVE A CHAR?
        JP      NZ,HST7A        ;YES
        JP      CKCTO           ;NO, CHECK FOR TIMEOUT
        RET     NZ              ;NOT TIMED OUT, RET
        JP      SENDBLOCK       ;WAS OK ANYWAY

HST7A:  CALL    SCANRD          ;GET REC'D CHAR (ETX)
        JP      SENDBLOCK

;COMPLETED P, BLOCK#, CKSUMH, CKSUML, ETX:
SENDBLOCK:                      ;TRANS REQ DATA IF OK
        public SENDBLOCK
        CALL    MAKEOLD         ;MAKE LAST DATA SENT OLD
                                ;(IF ANY WAS SENT)
        CALL    RDBQMEDAT       ;TRANSMIT THE BLOCK
        LD      HL,HST1         ;GO TO HST1
        LD      (HSTVEC),HL
        CALL    SETLHTO
        RET ;..HANGUP STATE:
HANGUPST:
        LD      A,0CH           ;DISPLAY 'H'
        OUT     (0B0H),A

POP     HL              ;KILL RETURN ADX ON STACK
        JP      HHANGUP

;..................
CKCTO:  LD      A,(CTO)
        AND     A
        RET
;..................

;..................
TRANSID:
        CALL    WAIT1_1         ;WAIT 1 SEC

LD      HL,0
        LD      (TCKSUM),HL     ;CLEAR TCKSUM PRIOR TO
```

-34-

```
                    ;STARTING
        LD    A,'H'      ;PREAMBLE
        CALL  TRANS

LD    A,'I'      ;PREAMBLE, pt.2
        CALL  TRANS      ;ADDED BY DAVID

;SERIAL NUMBER STUFF
;       LD    HL,SERNO       ;ADDED BY DAVID
        LD    HL, SerialNum  ;ADDED BY DAVID
        LD    B,8
        CALL  TNBYTES LD    A,(TDATE)
        CALL  TRANS
        LD    A,(TDAY)
        CALL  TRANS
        LD    A,(THR)
        CALL  TRANS
        LD    A,(TMIN)
        CALL  TRANS

CALL  TCK        ;TRANS CKSUM & ETX

LD    HL,IDCNT   ;BUMP ID TRANS COUNT
        INC   (HL)
        RET
;..................................
HHANGUP:
        LD    A,(CBUFWP) ; GET THE POINTER AND SAVE IT
;       LD    (TOPWP),A  ; FOR TESTING
        CALL  WAIT1_1    ;WAIT 1.1 SEC
        LD    A,(CBUFWP) ; GET THE POINTER AND SAVE IT
;       LD    (DAT1),A   ; FOR TESTING
        CALL  WAIT1_1    ;WAIT A WHILE LONGER TO BE SURE
        LD    A,'+'      ;+++ ESCAPE
        CALL  TRANS
        LD    A,'+'
        CALL  TRANS
        LD    A,'+'
        CALL  TRANS
        LD    A,(CBUFWP) ; GET THE POINTER AND SAVE IT
;       LD    (DAT2),A   ; FOR TESTING
        CALL  WAIT1_1    ;WAIT 1.1 SEC
        LD    A,(CBUFWP) ; GET THE POINTER AND SAVE IT
;       LD    (DAT3),A   ; FOR TESTING
        CALL  WAIT1_1    ;WAIT A WHILE LONGER TO BE SURE

LD    HL,ATH
        LD    B,3
        CALL  TSTRING    ;HANG UP
GETOUT:
        public GETOUT
        LD    A,(CBUFWP) ; GET THE POINTER AND SAVE IT

RET

;....................................
;..SET T.O. TO 255MS (LONG):
SETLHTO:
        PUSH  AF
        LD    A,255
        JR    SETHTO1

;..SET T.O. TO 40MS-10 CHAR TIMES:
SETHTO:
        PUSH  AF         ;SET TIME OUT
        LD    A,40       ;
SETHTO1:
        DI
        LD    (CTO),A    ;SET TIME OUT
        EI
        POP   AF         ;RESTORE A
        RET

;++++++ END OF CALL HOME ++++++++++++++++++++
        END
```

-35-

```c
#include "phonefix.h"
#include "cheader.h"

include <string.h> define MAX_MIN_IN_DAY 1440

/* issue is called by all the above routines.  It takes the error message*/
/* and any other information passed to it to determine the contents of*/
/* a log message for Phonehome to send.   After it's done it sets the*/
/* error flag for Phonehome to detect and updates the log buffer pointer*/
/* HLOGBEG is the address of the first usable address of HBUFLOG */
/* In the first 2 bytes of HLOGBEG is the current*/
/* entry point in HBUFLOG */ char *store_dat(char *address, char data);
char GetCurrentPeriod(char *ptr,char level);
char *GetNextTemp(char period, char *currInfo);

void issue(char error_type, char* information)
{
/* declare a local pointer for the log buffer */
char *local_pointer;
int  temp;

temp = *(int *)&HLOGBUF;
local_pointer = (char *)temp;

/* insert the error number*/ local_pointer = store_dat(local_pointer, error_type);

/* now the date and time*/
if (error_type == CHKERR)
        {
        local_pointer = store_dat(local_pointer, '\0');
        local_pointer = store_dat(local_pointer, '\0');
        local_pointer = store_dat(local_pointer, '\0');
        local_pointer = store_dat(local_pointer, '\0');
        }
else
        {
        local_pointer = store_dat(local_pointer, *(char *)&TMN);
        local_pointer = store_dat(local_pointer, *(char *)&TDATE);
        local_pointer = store_dat(local_pointer, *(char *)&THR);
        local_pointer = store_dat(local_pointer, *(char *)&TMIN);
        }

/* if we're dealing with a HVAC alarm then we need to*/
/* add some more information...*/ if (error_type == HVAC_ALERT)
        {
        /* add channel/ number*/
        local_pointer = store_dat(local_pointer, *information);

/* add temp reading that was obtained*/
        local_pointer = store_dat(local_pointer, *(information+1));

/* add nominal temperature reading */
        local_pointer = store_dat(local_pointer, *(information+2));
        }

/* insert the new end of file flag into the buffer */ local_pointer = store_dat(local_pointer, END_OF_FILE);

/* if the 'mail flag' for Phonehome isn't set then do so */
if (!(*(char *)&DATAREADY))
        *(char *)&DATAREADY = TRUE;

/* reset pointer to it's 'new' value- back it off by 1 so it's ON the */
/* new end of file marker */
*(&HLOGBUF) = (int)(local_pointer)-1;

return;
}

/* store_dat is used only by issue to manage the buffer pointer */
char *store_dat(char *address, char data)
{
/* save the data into the current address */
*address = data;

/* make sure we don't overrun the buffer */
/* the EOB address is contained in the first 2 bytes of the buffer */
if ((address + 1) > (char *)(&HLOGBEG) + 1024 )
        address = (char *)(&HLOGBEG);
else
        address++;

return(address);
```

```
}

/* power_loss senses a coldstart on the 8000 and issues a message for*/
/* Phonehome to send*/
void power_loss(void)
{

/* test to see if the 7th bit of Flagbit is true- if so then we're*/
/* doing a coldstart*/
if (*(char *)&FLAGBIT & 0x80)
       {
       issue(POWER_OUT, NULL);
       /* after issuing message then cancel flag*/
/*     *(char *)&FLAGBIT = *(char *)&FLAGBIT ^ 0x80; */
       }
return;
}

/* load the rtp table coming over the pager into the phonehome message */
/* buffer to relay to the PC */
void rtp_message(void)
{
unsigned char i;
//unsigned int address;
/* declare a local pointer for the log buffer */
char *local_pointer;
int  temp;

/* first let's see if this is a table we want */ if (*((char *)&CBUF1 + 2) - '0' == *(char *)&CLASS)
   {
   if (*(char *)&RTP_CHECKSUM == *((char *)&CBUF1 + RTP_MESSAGE_SIZE - 2))
       {
       /* issue the phonehome message */
       issue(RTP_TABLE, NULL);

/* get the pointer to the phonehome buffer */
       temp = *(int *)&HLOGBUF;
       local_pointer = (char *)temp;

/* process and transfer the data buffer for the pager into the phonehome */
       /* buffer following the rtp message header */
       for (i=1; i <= RTP_MESSAGE_SIZE; i++)
           {
           // if we need to convert the data from ASCII to binary, here would
           // be a good place to do it...
           local_pointer = store_dat(local_pointer, *((char *)&CBUF1 + i) );
           }

/* set the end of file pointer in the phonehome buffer */
       local_pointer = store_dat(local_pointer, END_OF_FILE);

// ASYNC2 will clear the buffer for us so just return...
       // when we're done, clear the buffer for the pager
       //*((unsigned int *)&CBUFRP1) = (char *)&CBUF1;
       //address = (int)&CBUF1;
       //CBUFRP1 = address;

/* reset pointer to it's 'new' value- back it off by 1 so it's ON the */
       /* new end of file marker */
       *(&HLOGBUF) = (int)(local_pointer)-1;
       }
   else
   issue(RTP_TABLE_ERROR, NULL);
   }
return;
}

/* integrity_check issues a*/
/* message for Phonehome to send if the checksums did not add up correctly*/
void integrity_check(void)
{
    issue(CHKERR, NULL);
    return;
}

/* HVAC_alarm is called from the sensor scan routine to verify */
/* that the current temperature reading is within limits if it's subject*/
/* to HVAC protection.  If so and this is the inital call then the */
/* time at which a Phonehome message will be logged is calculated. */
/* If the condition persists after this calculated time has elapsed then */
/* the Phonehome message is logged, otherwise the time is reset */ void HVAC_alarm(void)
{
unsigned char current_temp, current_tolerance, target_temp, info[3],
              out_of_tolerance, auto_cool_mode;
unsigned int minutes_for_today;
int j;
char *flagPtr, *minPtr;
unsigned char i;

/* check the zones/channels once a minute */
if (*(char *)&TSEC == 30 && !(*(char *)&RUN_ONCE))
    {
```

-37-

```
/* check all the zones/channels */
for (i = 0; i<=15; i++)
    {
    /* Execute only if this zone/channel has HVAC monitoring enabled */
    if (*((char *)&HVAC_MONITORED + i*6))
        {
        /* initialize the compare flag */
        out_of_tolerance = FALSE;

/* this code is only valid for zone data */
        if (i <= 7)
            {
            /* get the CR time */
            switch(i+1)
                {
                case 1:
                    flagPtr = (char *) (&FLAGBITA);   // flagPtr+0 = IX+1
                    minPtr = (char *) (&SSMIN1A);    // Get addr of start of program data
                    break;
                case 2:
                    flagPtr = (char *) (&FLAGBITB);
                    minPtr = (char *)(&SSMIN1B);
                    break;
                case 3:
                    flagPtr = (char *) (&FLAGBITC);
                    minPtr = (char *) (&SSMIN1C);
                    break;
                case 4:
                        flagPtr = (char *) (&FLAGBITD);
                        minPtr = (char *) (&SSMIN1D);
                    break;
                case 5:
                        flagPtr = (char *) (&FLAGBITE);
                        minPtr = (char *) (&SSMIN1E);
                    break;
                case 6:
                        flagPtr = (char *) (&FLAGBITF);
                        minPtr = (char *) (&SSMIN1F);
                    break;
                case 7:
                        flagPtr = (char *) (&FLAGBITG);
                        minPtr = (char *) (&SSMIN1G);
                    break;
                case 8:
                        flagPtr = (char *) (&FLAGBITH);
                        minPtr = (char *) (&SSMIN1H);
                    break;
                default:
                    break;
                }
            /* minPtr returns the pointer to the A/C value for the current */
            /* period */
            j = (GetCurrentPeriod(minPtr,1)) - 1 ;
            if (j < 0)
                j = NUMPERIOD-1;
            minPtr = GetNextTemp(j,minPtr);

/* mask off and check the heat/cool mode flag for this zone */
            /* manual_cool_mode will be 0 if in heat mode, 1 if in cool */
/*          manual_cool_mode = BIT(2,flagPtr); */

/* Get the current ambient temperature read. */
            current_temp = *((char *)&ATEMPA + i*40);

/* Get the tolerance value.*/
            current_tolerance = *((char *)&HVAC_TOL + i*6);

/* check to see if we're in recovery */
            if (BIT(i, &RECOVERING))
                {
                /* get the target temp */
                if (current_temp > *(minPtr))
                    {
                    target_temp = *(minPtr) + ALARMCODE;
                    auto_cool_mode = TRUE;
                    }
                else if (current_temp < *(minPtr+1))
                    {
                    target_temp = *(minPtr+1) - ALARMCODE;
                    auto_cool_mode = FALSE;
                    }
                else
                    target_temp = current_temp;
                }
            else
                {
                /* if we're not in recovery, then do this: */

/* Get the current target temperatures */
                if (current_temp > *((char *)&TTEMPA + i*40))
                    {
                    auto_cool_mode = TRUE;
                    target_temp = *((char *)&TTEMPA + i*40);
                    }
                else if (current_temp < *((char *)&HTEMPA + i*40))
                    {
                    target_temp = *((char *)&HTEMPA + i*40);
                    auto_cool_mode = FALSE;
                    }
```

-38-

```c
                else
                    target_temp = current_temp;
                }
            /* compare the values and set the compare flag to true if */
            /* we've got an out-of-bounds condition */
            if ((!auto_cool_mode && ((current_temp < (target_temp - current_tolerance))) ||
                 (auto_cool_mode && (current_temp > (target_temp + current_tolerance)))))
                out_of_tolerance = TRUE;
            }
        else
            {
            /* this code valid for channel data */
            /* Get the current ambient temperatures */
            current_temp = *((char *)&KWDATA1 + i-8);

/* Get the current target temperatures */
            target_temp = *((char *)&HVAC_TOL + i*6);

/* compare the values and set the compare flag to true if */
            /* we've got an out-of-bounds condition */
            if (((*(char *)&HVAC_MONITORED == COLD_MODE) && current_temp < target_temp) ||
                ((*(char *)&HVAC_MONITORED == HEAT_MODE) && current_temp > target_temp))
                out_of_tolerance = TRUE;
            }

/* calculate the current minutes in today for use later in the program */
        minutes_for_today = (*((char *) &THR) * 60) + *((char *) &TMIN);

/* if we've determined that either we're out of tolerance then we've */
        /* got a problem */
        if (out_of_tolerance)
            {
            /* initiate monitoring of this channel if we haven't done so already */
            if (*((char *)&HVAC_ALERT_FLAG + i*6) == 0)
                {
                *((unsigned int *)&HVAC_ABS_TIMEOUT + i*3) = minutes_for_today +
                    *((char *)&HVAC_TIMEOUT + i*6);

/* in case we've overrun into the next day then recompute */
                /* the time for that day */
                if (*((unsigned int *)&HVAC_ABS_TIMEOUT + i*3) > MAX_MIN_IN_DAY)
                    *((unsigned int *)&HVAC_ABS_TIMEOUT + i*3) =
                        *((unsigned int *)&HVAC_ABS_TIMEOUT + i*3) - MAX_MIN_IN_DAY;

/* set the flag to watch this zone/channel to true */
                *((char *)&HVAC_ALERT_FLAG + i*6) = 1;
                }
            else
            /* continue monitoring if we've already started (1 indicates this)*/
            /* ignore the flag if its set for 2- that just means */
            /* a phonehome message for this zone/channel has already */
            /* been issued and is pending transmission */
            if ((*((char *)&HVAC_ALERT_FLAG + i*6) == 1) &&
                    *((unsigned int *)&HVAC_ABS_TIMEOUT + i*3) <= minutes_for_today)
                {
                /* gather up the info to send thru Phonehome */
                info[0] = i + 1;  /* give the zone as a value from 1 to 16 */
                info[1] = target_temp;
                info[2] = current_temp;

/* go tell Phonehome about this */
                issue(HVAC_ALERT, info);

/* clear the timeout value (just to be neat) */
                *((unsigned int *)&HVAC_ABS_TIMEOUT + i*3) = 0;

/* set the alert to indicate that we've already generated */
                /* a phonehome for this zone/channel */
                *((char *)&HVAC_ALERT_FLAG + i*6) = 2;
                }
            }
        else
            if (*((char *)&HVAC_ALERT_FLAG + i*6) == 1)
                /* We've dropped within tolerance since this was issued, so */
                /* it must've been a false alarm.... */
                *((char *)&HVAC_ALERT_FLAG + i*6) = 0;
        }
    /* set 'debounce' flag so this routine doesn't get repeated in the same */
    /* second */
        *(char *)&RUN_ONCE = 1;
    }
else if (*(char *)&RUN_ONCE && *(char *)&TSEC != 30)
    /* clear 'debounce' flag if we're out of our 'time slot'*/
    *(char *)&RUN_ONCE = 0;
return;
}

/* reset_buffer resets the contents to the HLOGBUF to all zeros */ void reset_buffer(void)
{
char *i;

for (i = (char *)&HLOGBEG + 3; i < ((char *)&HLOGBEG + 1023); *(i++) = '\0');
*((char *)&HENDOFBUF) = '\xFD';
```

-39-

```
return;
}
```

What is claimed is:

1. A method of controlling energy utilization at a plurality of buildings having respective heating, ventilating and air conditioning equipment, said method comprising steps of:

(a) using, through a selected one of a plurality of control signal generation locations, a pre-existing communication infrastructure to communicate with a plurality of pagers respectively connected to a plurality of energy management systems respectively located at a plurality of buildings and respectively connected to heating, ventilating and air conditioning equipment thereat, for controlling temperature setpoints in the energy management systems, wherein the pre-existing communication infrastructure includes a paging network which transmits data in response to data input into the paging network through the selected control signal generation location, wherein said step of using a pre-existing communication infrastructure includes transmitting through the paging network one pager addressing code and a stream of data, the stream of data including both energy management system address data and energy management system control data, said transmitting including inputting into the energy management system control data information defining a temperature setpoint change and whether the change is an incremental increase or decrease of, or a replacement of, a pre-existing temperature setpoint;

(b) receiving the transmitted pager addressing code and the stream of data with the plurality of pagers, wherein each pager is programmed to respond to the same pager addressing code and each energy management system includes data storage memory;

(c) receiving the stream of data through a respective one of the pagers and storing the stream of data in the data storage memory of the respective energy management system in response to the pager connected to the respective energy management system receiving the pager addressing code for which the pager is programmed;

(d) determining within each respective energy management system having the stream of data stored in the data storage memory thereof whether that respective energy management system is addressed by the energy management system address data of the stored stream of data; and (e) with each energy management system that determines it is addressed by the energy management system address data, automatically changing temperature setpoints in the respective energy management system in response to the energy management system control data of the stored stream of data so that the respective energy management system causes incremental temperature changes to occur in the respective building in response to the stored data.

2. A method as defined in claim 1, further comprising automatically transmitting, through a commercial telephone network from the energy management system to at least one of the control signal generation locations, responsive data from each energy management system determined to be addressed in said step (d).

3. A method as defined in claim 1, wherein said step (a) includes transmitting from a computer, through a modem to a commercial telephone network, and from the commercial telephone network through a commercial paging network.

4. A method as defined in claim 1, wherein said step (a) includes transmitting from a hardwired telephone set, through a commercial telephone network, and from the commercial telephone network through a commercial paging network.

5. A method as defined in claim 1, wherein said step (a) includes transmitting through a cellular telephone network to a commercial telephone network, and from the commercial telephone network through a commercial paging network.

6. A method as defined in claim 1, wherein said step (a) includes transmitting through a private paging network.

7. A method as defined in claim 1, wherein:

the energy management system address data includes at least one of a plurality of hierarchical addresses, each of which hierarchical addresses designates different groups of energy management systems which are to respond to the received data, which different groups range from a single energy management system to all the energy management systems within a predetermined region of communication; and said step (e) is performed by an energy management system included in a group designated by a hierarchical address received by the energy management system.

8. A method as defined in claim 7, wherein the hierarchical addresses include six message codewords defining a power utility region address, a transmission line address, a substation address, a major distribution feeder address, a minor distribution feeder address, and an individual pager address.

9. A method as defined in claim 1, wherein said step (a) includes inputting a single predetermined pager telephone number and the stream of data into a commercial telephone network.

10. A method of controlling energy utilization at a plurality of buildings having respective heating, ventilating and air conditioning equipment, said method comprising steps of:

(a) using, through a selected one of a plurality of control signal generation locations, a pre-existing communication infrastructure to communicate with a plurality of pagers respectively connected to a plurality of energy management systems respectively located at a plurality of buildings and respectively connected to heating, ventilating and air conditioning equipment thereat, for changing temperature setpoints used in the energy management systems, wherein the pre-existing communication infrastructure includes a paging network which generates a predetermined capcode and which transmits data with the predetermined capcode in response to data input into the paging network, wherein said step of using a pre-existing communication infrastructure includes transmitting through the paging network a frame synchronization code, one capcode and a stream of data, the stream of data including both energy management system address data and energy management system control data, said transmitting including inputting into the energy management system control data information defining a temperature setpoint change and whether the change is an incremental increase or decrease of, or a replacement of, a pre-existing temperature setpoint;

(b) receiving the transmitted predetermined capcode and the stream of data with the plurality of pagers, wherein each pager is programmed to respond to the same predetermined capcode and each energy management system includes a respective microprocessor and respective data storage memory;

(c) receiving the stream of data from a serial data port of a respective one of the pagers through an asynchronous data port of the microprocessor of the respective energy management system and storing the stream of data in the data storage memory of the respective energy management system in response to the pager connected to the respective energy management system receiving the predetermined capcode for which the pager is programmed, wherein the microprocessor operates at a faster speed than the transmission speed of the stream of data such that the microprocessor stores the data byte by byte in the data storage memory;

(d) determining within each respective energy management system having the stream of data stored in the data storage memory thereof whether that respective energy management system is addressed by the energy management system address data of the stored stream of data; and (e) with each energy management system that determines it is addressed by the energy management system address data, automatically changing temperature setpoints in the respective energy management system in response to the energy management system control data of the stored stream of data so that the respective energy management system causes incremental temperature changes to occur in the respective building in response to the stored data.

11. A method as defined in claim 10, further comprising automatically transmitting, through a commercial telephone network from the energy management system to at least one of the control signal generation locations, responsive data from each energy management system determined to be addressed in said step (d).

12. A method as defined in claim 10 wherein said step (a) includes transmitting from a computer, through a modem to a commercial telephone network, and from the commercial telephone network through a commercial paging network.

13. A method as defined in claim 10, wherein said step (a) includes transmitting from a hardwired telephone set, through a commercial telephone network, and from the commercial telephone network through a commercial paging network.

14. A method as defined in claim 10, wherein said step (a) includes transmitting through a cellular telephone network to a commercial telephone network, and from the commercial telephone network through a commercial paging network.

15. A method as defined in claim 10, wherein said step (a) includes transmitting through a private paging network.

16. A method as defined in claim 10, wherein:

the energy management system address data includes at least one of a plurality of hierarchical addresses, each of which hierarchical addresses designates different groups of energy management systems which are to respond to the received data, which different groups range from a single energy management system to all the energy management systems within a predetermined region of communication; and said step (e) is performed by an energy management system included in a group designated by a hierarchical address received by the energy management system.

17. A method as defined in claim 16, wherein the energy management system address data includes six message codewords defining a power utility region address, a transmission line address, a substation address, a major distribution feeder address, a minor distribution feeder address, and an individual pager address.

18. A method as defined in claim 10, wherein said step (a) includes inputting a single predetermined pager telephone number and the stream of data into a commercial telephone network.

* * * * *